United States Patent
Murata

(10) Patent No.: US 8,958,115 B2
(45) Date of Patent: Feb. 17, 2015

(54) INFORMATION PROCESSING APPARATUS AND COMPUTER READABLE STORAGE MEDIUM STORING INSTRUCTION FOR SETTING NUMBER OF PAGES TO FIT TO SINGLE SHEET

(71) Applicant: Mareyuki Murata, Kuwana (JP)

(72) Inventor: Mareyuki Murata, Kuwana (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 65 days.

(21) Appl. No.: 13/755,750

(22) Filed: Jan. 31, 2013

(65) Prior Publication Data

US 2013/0194595 A1 Aug. 1, 2013

(30) Foreign Application Priority Data

Jan. 31, 2012 (JP) ................................ 2012-018107

(51) Int. Cl.
*H04N 1/40* (2006.01)
*G06K 15/00* (2006.01)
*G06F 3/12* (2006.01)

(52) U.S. Cl.
CPC .......... *G06K 15/4065* (2013.01); *G06F 3/1219* (2013.01); *G06F 3/125* (2013.01); *G06F 3/1285* (2013.01)
USPC ....................................... 358/1.18; 358/1.13

(58) Field of Classification Search
CPC ..... G06F 3/1204; G06F 3/125; G06F 3/1284; G06F 3/1254; G06F 21/84; G06F 3/121; G06F 3/1255; G06F 17/217; G06K 15/00; H04N 1/3248; H04N 2201/3288; H04N 1/3875
USPC ........ 358/1.15–1.18, 1.9, 1.12–1.13, 1.1–1.2, 358/296, 452–453, 449; 399/364, 370, 374, 399/82; 382/284
See application file for complete search history.

(56) References Cited

U.S. PATENT DOCUMENTS

| | | | |
|---|---|---|---|
| 6,202,092 B1 * | 3/2001 | Takimoto | 709/225 |
| 2003/0113130 A1 | 6/2003 | Robertson et al. | |
| 2007/0291309 A1 * | 12/2007 | Kurimura | 358/1.18 |

FOREIGN PATENT DOCUMENTS

| | | |
|---|---|---|
| JP | 11-84952 | 3/1999 |
| JP | 11-259264 | 9/1999 |
| JP | 2003-220739 | 8/2003 |
| JP | 2007-121731 | 5/2007 |

* cited by examiner

*Primary Examiner* — Thomas D Lee
*Assistant Examiner* — Stephen M Brinich
(74) *Attorney, Agent, or Firm* — Scully, Scott, Murphy & Presser, P.C.

(57) ABSTRACT

An information processing apparatus may include a controller. The controller may be configured to receive a desired number of pages to fit to a single sheet and determine whether the received desired number of pages is equal to or greater than a predetermined reference number of pages. The controller may be further configured to set a number of pages to fit to a single sheet to the received desired number of pages if the received desired number of pages is equal to or greater than the predetermined reference number of pages and display an error screen if the received desired number of pages is smaller than the predetermined reference number of pages.

14 Claims, 15 Drawing Sheets

Fig.5

| SETTING VALUES OF MULTIPLE-PAGE PRINT OPTIONS | | PRINT LAYOUT | NUMBER OF PAGES TO FIT TO SINGLE SHEET P1 |
|---|---|---|---|
| | SINGLE/ DOUBLE-SIDED PRINTING | | |
| | SINGLE-SIDED PRINTING | 1in1 | 1 |
| | | 2in1 | 2 |
| | | 4in1 | 4 |
| | | 9in1 | 9 |
| | | 16in1 | 16 |
| | DOUBLE-SIDED PRINTING | 1in1 | 2 |
| | | 2in1 | 4 |
| | | 4in1 | 8 |
| | | 9in1 | 18 |
| | | 16in1 | 32 |
| POSTER PRINTING | | 1×1 | |

Fig.6

| SETTING VALUES OF MULTIPLE-PAGE PRINT OPTIONS | | NUMBER OF PAGES TO FIT TO SINGLE SHEET P1 |
|---|---|---|
| PRINT LAYOUT | SINGLE/DOUBLE-SIDED PRINTING | POSTER PRINTING | |
| 1 in 1 | SINGLE-SIDED PRINTING | 1 × 1 | 1 |
| | | 2 × 2 | 0.25 |
| | | 3 × 3 | 0.11 |
| | | 4 × 4 | 0.06 |
| | DOUBLE-SIDED PRINTING | 1 × 1 | 2 |
| | | 2 × 2 | 0.5 |
| | | 3 × 3 | 0.22 |
| | | 4 × 4 | 0.125 |

Fig.8

PRINT OPTIONS — 31

| PRINT SHEET SIZE | A4 |
| COLOR/MONOCHROME PRINTING | MONOCHROME PRINTING |
| SINGLE/DOUBLE-SIDED PRINTING | SINGLE-SIDED PRINTING |
| PRINT LAYOUT | 4 in 1 |
| POSTER PRINTING | 1 in 1 |
| | 2 in 1 |
| | 4 in 1 |
| | 9 in 1 |
| | 16 in 1 |
| ☐ TONER SAVING PRINTING | |
| [ADMINISTRATOR SETTING] | |

[OK] [CANCEL]

↑ CANCEL        SELECT 2 IN 1 ↓

WARNING — 33

⚠ CONDITION OF MINIMUM NUMBER OF PAGES TO FIT TO SINGLE SHEET IS NOT SATISFIED. IF SETTING CHANGE IS CONTINUED, FOLLOWING SETTING IS CHANGED.

SINGLE/DOUBLE-SIDED PRINTING: SINGLE TO DOUBLE

CONTINUE?

[OK]  [CANCEL]
 33a   33b
   OK ↓

PRINT OPTIONS — 31

| PRINT SHEET SIZE | A4 |
| COLOR/MONOCHROME PRINTING | MONOCHROME PRINTING |
| SINGLE/DOUBLE-SIDED PRINTING | DOUBLE-SIDED PRINTING |
| PRINT LAYOUT | 2 in 1 |
| POSTER PRINTING | 1 × 1 |
| ☐ TONER SAVING PRINTING | |
| [ADMINISTRATOR SETTING] | |

[OK] [CANCEL]

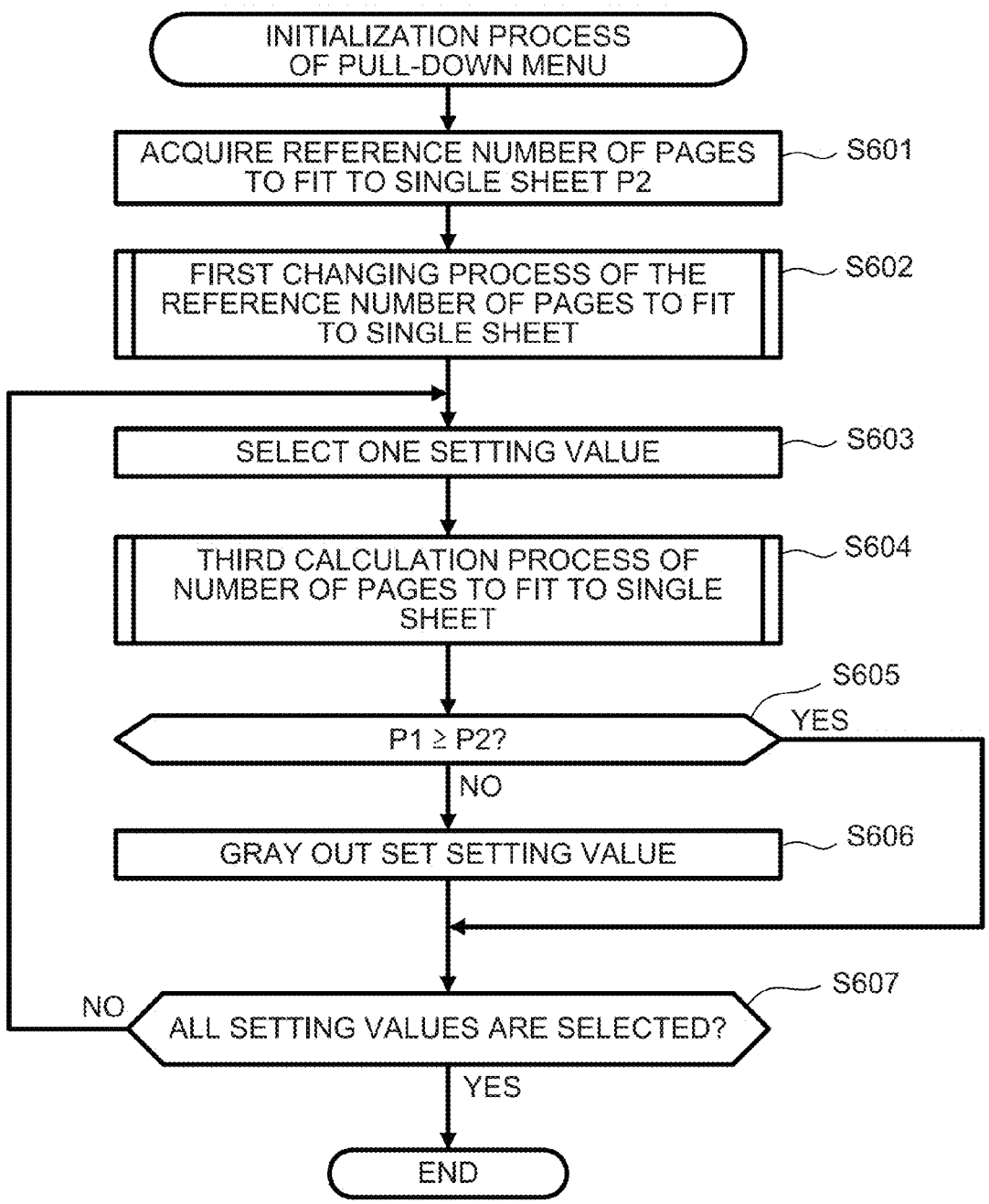

… (US 8,958,115 B2)

INFORMATION PROCESSING APPARATUS AND COMPUTER READABLE STORAGE MEDIUM STORING INSTRUCTION FOR SETTING NUMBER OF PAGES TO FIT TO SINGLE SHEET

CROSS-REFERENCE TO RELATED APPLICATION

This application claims priority from Japanese Patent Application No. 2012-018017 filed on Jan. 31, 2012, which is incorporated herein by reference.

FIELD OF DISCLOSURE

Aspects of disclosure relate to a technique for setting the number of pages to fit to a single sheet.

BACKGROUND

There is a technique to print images corresponding to multiple pages on a single paper sheet (hereafter, "sheet") to reduce the amount of usage of consumable supplies. For example, a technique to automatically set the number of pages to fit to a single sheet in accordance with the ratio of the number of pages of predetermined size among all the pages of the print job is presented.

SUMMARY

In such a related art technique, there is a problem that automatic setting of the number of pages to fit to a single sheet limits the user's degree of freedom. The inventive system and method described herein provides a technique to increase the degree of freedom in setting the number of pages to fit to a single sheet while reducing the amount of usage of consumable supplies, such as a sheet.

Aspects of the disclosure relate to an information processing apparatus which may include a controller. The controller may be configured to receive a desired number of pages to fit to a single sheet and determine whether the received desired number of pages is equal to or greater than a predetermined reference number of pages to fit to a single sheet. The controller may be further configured to set a number of pages to fit to a single sheet to the received desired number of pages if the received desired number of pages is equal to or greater than the predetermined reference number of pages and display an error screen if the received desired number of pages is less than the predetermined reference number of pages.

Aspects of the disclosure relate to an information processing apparatus which may include a controller. The controller may be configured to display as selectable one or more numbers of pages to fit to a single sheet, each of the numbers equal to or greater than a predetermined reference number of pages to fit to a single sheet, receive, as a selected number of pages to fit to a single sheet, one of the one or more selectable numbers of pages, set the received number of pages to the selected number of pages to fit to a single sheet.

Aspects of the disclosure relate to a non-transitory computer readable storage medium storing instructions. The instructions, when executed, cause an information processing apparatus to perform receiving a desired number of pages to fit to a single sheet and determining whether the received desired number of pages is equal to or greater than a predetermined reference number of pages to fit to a single sheet. The instructions, when executed, further cause the information processing apparatus to perform setting a number of pages to fit to a single sheet to the received desired number of pages if the received desired number of pages is equal to or greater than the predetermined reference number of pages and displaying an error screen if the received desired number of pages is less than the predetermined reference number of pages.

Aspects of the disclosure relate to a non-transitory computer readable storage medium storing instructions. The instructions, when executed, cause an information processing apparatus to perform displaying as selectable one or more numbers of pages to fit to a single sheet, each of the numbers equal to or greater than a predetermined reference number of pages to fit to a single sheet, receiving, as a selected number of pages to fit to a single sheet one of the one or more selectable numbers of pages and setting the received number of pages to the selected number of pages to fit to a single sheet.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings.

FIG. 5 is a schematic diagram depicting the number of pages to fit to a single sheet which is to be calculated.

FIG. 6 is another schematic diagram depicting the number of pages to fit to a single sheet which is to be calculated.

FIG. 8 is a schematic diagram depicting screen displays used for selecting setting values of multiple-page print options.

FIG. 15 is a flowchart depicting an initialization process of a pull-down menu according to one or more aspects of the disclosure.

DETAILED DESCRIPTION

First Embodiment

One or more aspects of an embodiment are described with reference to FIGS. 1 to 11.

(1) Electrical Configuration of Personal Computer

Figure 1:
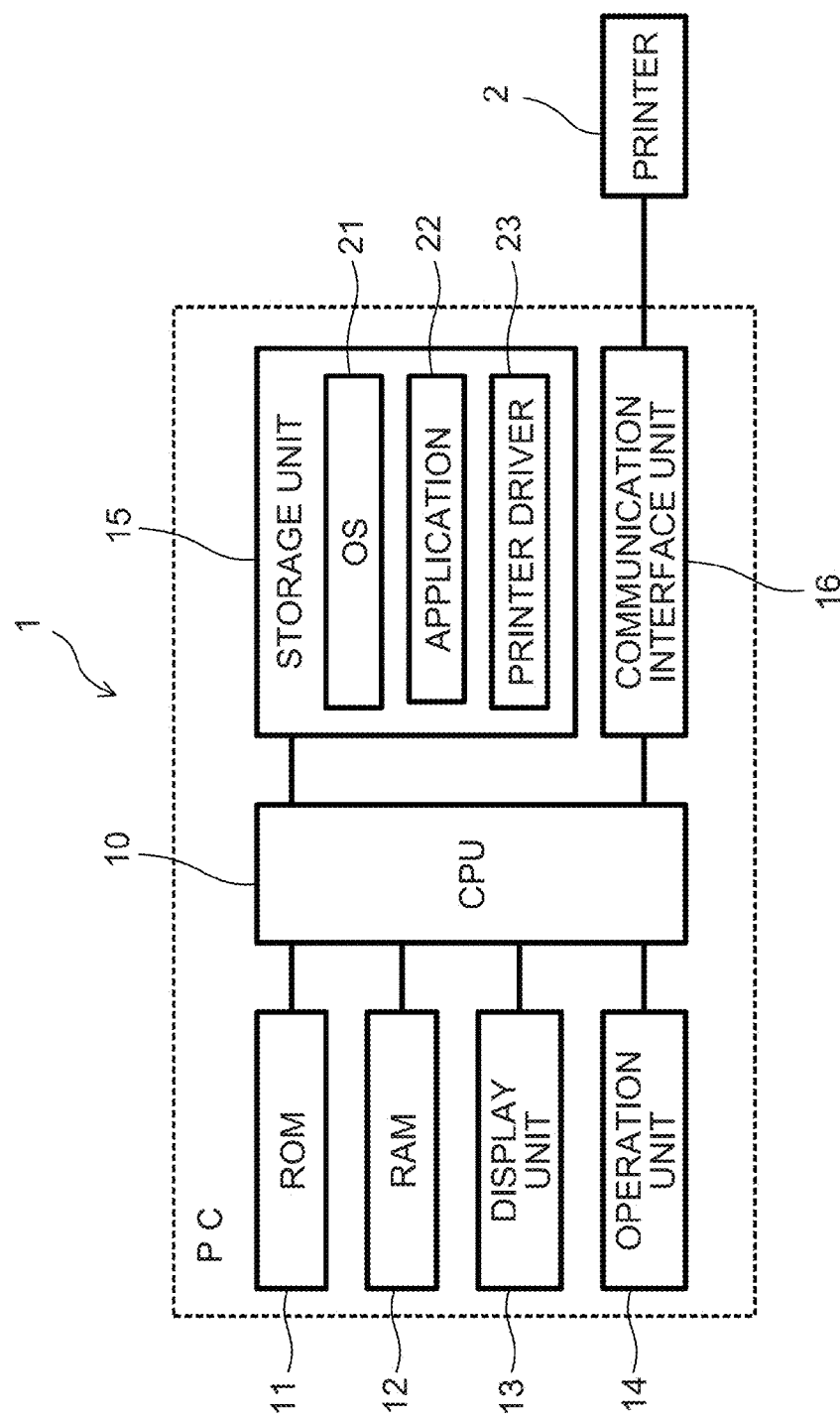
FIG. 1 is a block diagram depicting an electrical configuration of an information processing apparatus according to according to one or more aspects of the disclosure.

As shown in FIG. 1, a personal computer (hereafter, "PC") 1 includes a CPU 10, a ROM 11, a RAM 12, a display unit 13, an operation unit 14, a storage unit 15 and a communication interface unit 16.

In one aspect CPU 10 controls each unit of the PC 1 by executing programs stored in the ROM 11 and the storage unit 15 and programs, data, and so forth which are executed by the CPU 10 are stored in the ROM 11. In one aspect, the RAM 12 is used as a main storage unit in which the CPU 10 carries out various processes. In one aspect, the CPU 10 is a processing unit.

In one aspect, the display unit 13 includes a display device, such as a liquid crystal display and a display driving circuit which drives the display device. In one aspect, the operation unit 14 includes a keyboard, a mouse and an interface to which the keyboard and the mouse are connected.

The storage unit 15 is a device which stores various programs and data using nonvolatile memory, such as hard disk and flash memory. In one aspect, an operating system (hereafter, "OS") 21, an application program (hereafter, "application") 22, a printer driver 23 which controls a printer 2, and so forth are stored in the storage unit 15. The printer driver 23 is a program for setting the number of pages to fit to a single sheet.

The application 22 is any program, such as word processor software and spreadsheet software, as long as it has a function to output data to be printed to the printer driver 23 via the OS 21.

The communication interface unit 16 connects the PC 1 with printer 2 so that communication can be established therebetween. The communication interface unit 16 is configured to communicate with the printer 2 via, for example, a wired or wireless communication network, such as a local area network (LAN), a universal serial bus (USB), or a parallel communication.

(2) Printer 2

The printer 2 is a device for printing an image represented by print data received from the PC 1 on a print sheet. In the first embodiment, an electrophotographic printer 2 for prints using toner will be described as an example. The printer 2 in this embodiment may be an inkjet printer for printing using ink. Toner and ink are colorants.

(3) Setting Print Conditions

Figure 2:
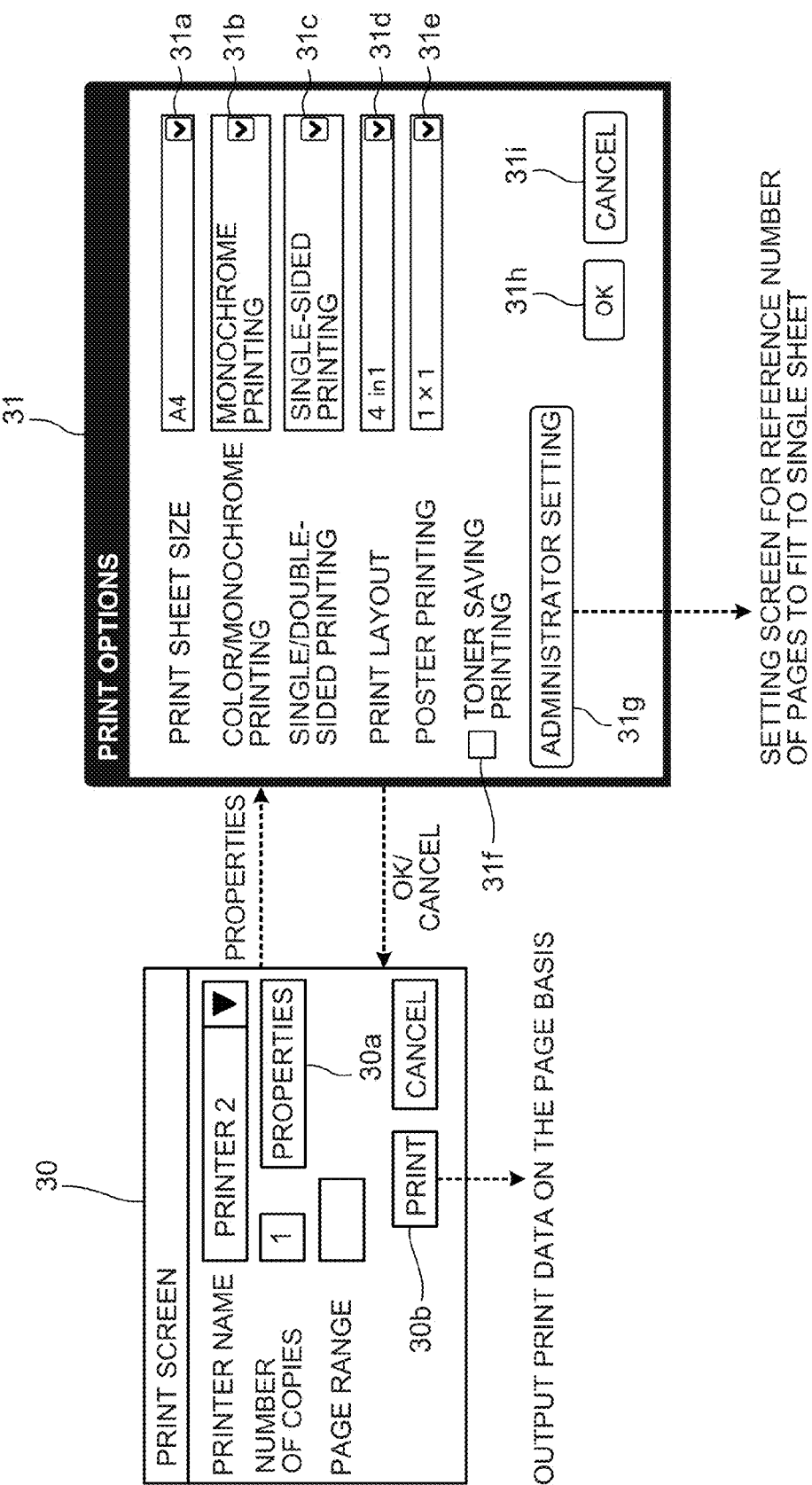
FIG. 2 is a schematic diagram depicting a print screen and a print option setting screen.

FIG. 2 depicts a print screen 30 displayed by the application 22, and a print option setting screen 31 displayed by the printer driver 23. By clicking a property button 30a on the print screen 30, a user can invoke a printer driver 23 which controls a currently selected printer. FIG. 2 depicts the print screen 30 when the property button 30a is clicked in a state in which the printer 2 has been selected.

Invoking the printer driver 23 causes the print option setting screen 31 for setting print conditions to be displayed on the display unit 13. On the print option setting screen 31, setting fields 31a to 31e and a checkbox 31f are used for establishing setting values of print options, such as the print sheet size, color/monochrome printing, single/double-sided printing, print layouts, poster printing, and toner saving printing. As setting values first displayed in the setting fields 31a to 31e and in the checkbox 31f, the last set values are displayed if the previously set values are stored and predetermined initial values are displayed if the previously set values are not stored.

In one aspect, pull-down menus are prepared for print options other than the toner saving printing. Setting values which can be set as the print options are displayed in a list on the pull-down menu. When the user selects a setting value with the pull-down menu, the selected setting value is displayed on a corresponding setting field on the print option setting screen 31. The setting value is set on the print option setting screen 31.

Figure 3:
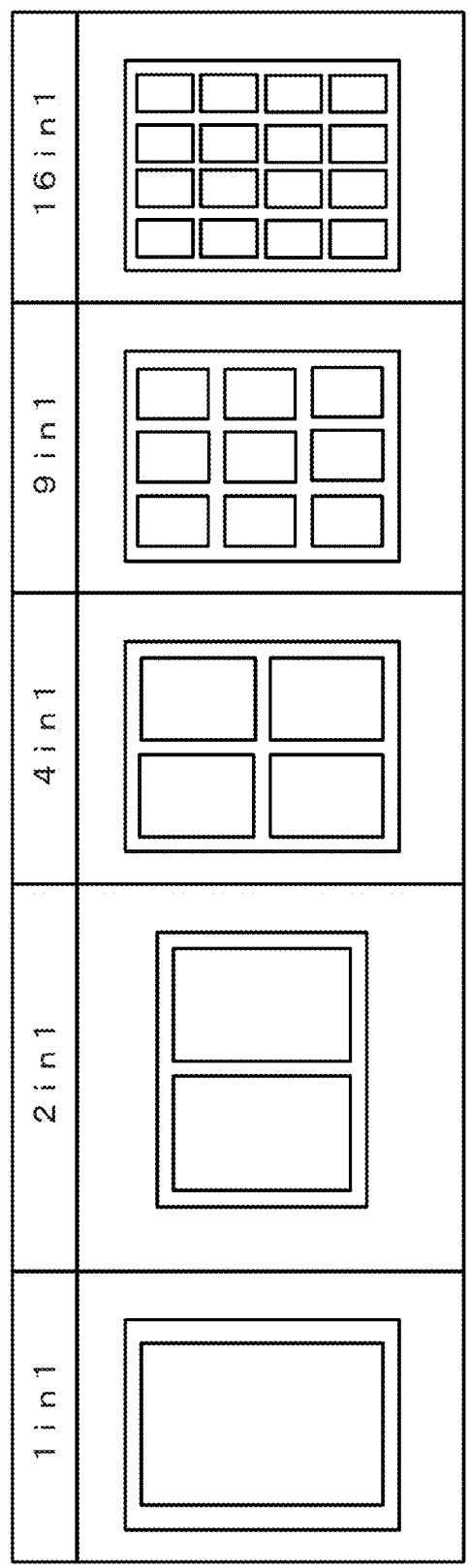
FIG. 3 is a schematic diagram depicting print layouts.

The print layout is an option for setting the number of pages to fit to a single side of each print sheet. The page corresponds to data of a unit to be printed on a single side of a print sheet when printing is made on the single side of the print sheet. As shown in FIG. 3, 1 in 1, 2 in 1, 4 in 1, 9 in 1 and 16 in 1 may be selected as the setting value of the print layout. In the present embodiment, setting values other than 1 in 1, i.e., the setting values of 2 in 1 or greater, are referred to as N in 1.

Figure 4:
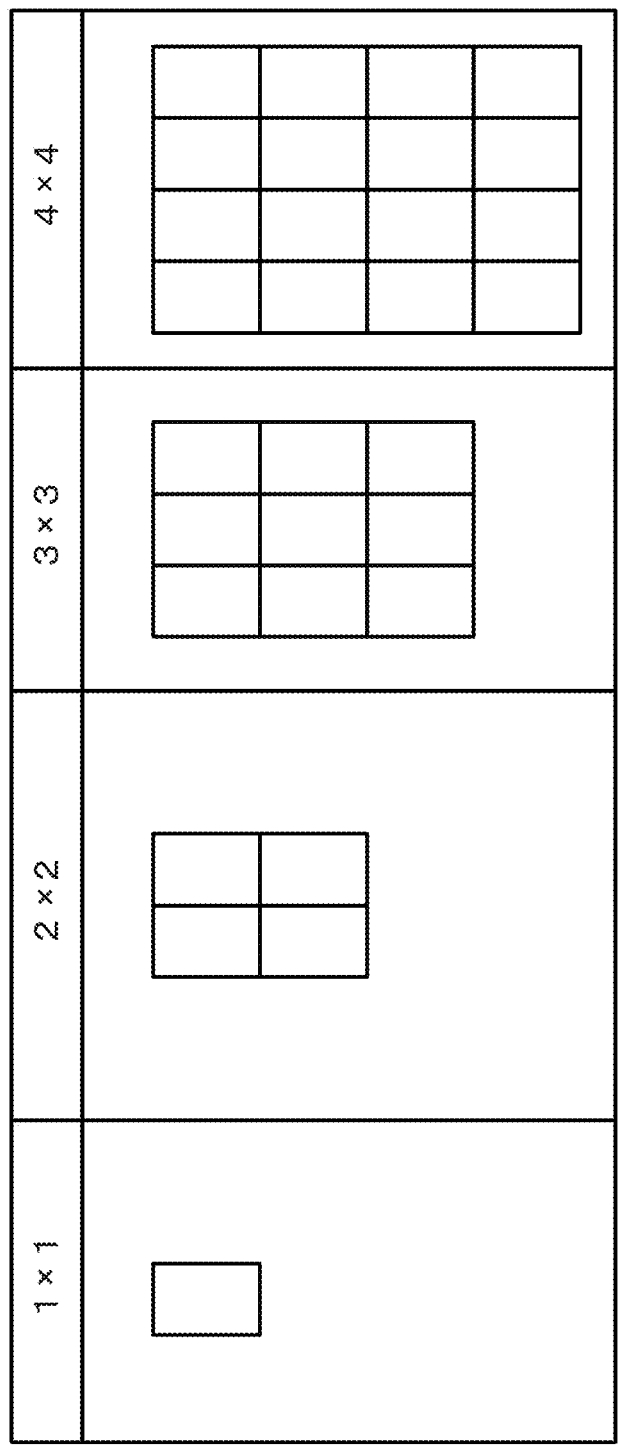
FIG. 4 is a schematic diagram depicting poster printing.

Poster printing is an option in which a page is divided into multiple sections and each of the divided sections is printed on a single print sheet. The user may create a poster which represents the page by sticking together the print sheets on which the sections are printed. As shown in FIG. 4, 1×1, 2×2, 3×3 and 4×4 are set as the setting value for the poster printing. In the present embodiment, setting values other than 1×1, i.e., setting values of 2×2 or greater, are referred to as N×N.

Here, N in 1 (N>=2) and N×N (N>=2) are not able to be set at the same time. If N in 1 is set, N×N is not able to be set but only 1×1 is set for the poster printing option. On the contrary, if N×N is set, N in 1 is not able to be set but only 1 in 1 is set for the print layout.

As shown in FIG. 2, toner saving printing option relates to setting of reduction in the amount of toner in printing pages. If the checkbox of toner saving printing is checked, toner-saved printing is performed with, for example, reduced size of each dot formed on the print sheet or reduced number of dots corresponding to a single pixel of image data.

An administrator setting button 31g is used to display a setting screen for the reference number of pages to fit to a single sheet 32 (see FIG. 7) for setting the reference number of pages to fit to a single sheet which will be described later. Details of the setting screen for the reference number of pages to fit to a single sheet 32 will be described later.

When the user clicks an OK button 31h or a cancel button 31i on the print option setting screen 31, the screen returns to the print screen 30. If the OK button 31h is clicked, the printer driver 23 writes, in a predetermined area of the RAM 12, the setting values set on the print option setting screen 31 as print conditions and the screen returns to the print screen 30. If the cancel button 31i is clicked, the printer driver 23 does not write the setting values set on the print option setting screen 31 in the predetermined area described above and the display returns to the print screen 30. When the user clicks a print button 30b on the print screen 30, data to be printed is output to the printer driver 23 on the page basis via the OS 21 from the application 22.

(4) Number of Pages to Fit to Single Sheet

The number of pages to fit to a single sheet is the sum of the number of pages to fit to one surface of the print sheet and the number of pages to fit to the other surface of the print sheet. The number of pages to fit to a single sheet differs from the print layout setting. The print layout is related to the number of pages to fit to a single side of a print sheet. The number of pages to fit to a single sheet is related to the number of pages to fit to both sides of the print sheet. The number of pages to fit to a single sheet is calculated on the basis of setting values of single/double-sided printing, print layout and poster printing. Single/double-sided printing, print layout and poster printing are multiple-page print options for the calculation of the number of pages to fit to a single sheet. A process for calculating the number of pages to fit to a single sheet will be described later. The calculated number of pages to fit to a single sheet will be described in FIG. 5 and FIG. 6.

As shown in FIG. 5, when 1×1 is set for poster printing, the number of pages to fit to a single sheet is calculated on the basis of the setting values of the single/double-sided printing and the print layout.

As shown in FIG. 6, when 1 in 1 is set for print layout, the number of pages to fit to a single sheet is calculated on the basis of the setting values of single/double-sided printing and poster printing.

As shown in FIGS. 5 and 6, the number of pages to fit to a single sheet when 1×1 is set for poster printing is 1 or greater. The number of pages to fit to a single sheet when N×N (N>=2) is set for poster printing is less than 1.

(5) Reference Number of Pages to Fit to Single Sheet

The reference number of pages to fit to a single sheet is the minimum number of pages that can be set to fit to a single sheet. When setting values of the multiple-page print options are selected, the printer driver 23 calculates the number of pages to fit to a single sheet on the basis of the selected setting values. If the calculated number of pages to fit to a single sheet is equal to or greater than the reference number of pages to fit to a single sheet, the printer driver 23 sets the selected setting value on the print option setting screen 31. If the calculated number of pages to fit to a single sheet is smaller than the reference number of pages to fit to a single sheet, the printer driver 23 does not set the selected setting value on the print option setting screen 31. If the selected setting value is not set, the setting values displayed on the print option setting screen 31 are not changed from those before the selection is made.

If the number of pages to fit to a single sheet is small, the amount of usage of consumable supplies, such as print sheets and colorants, become large. Therefore, the amount of usage of consumable supplies is reduced by limiting the number of pages to fit to a single sheet to equal to or greater than the predetermined number of pages as described above.

Figure 7:
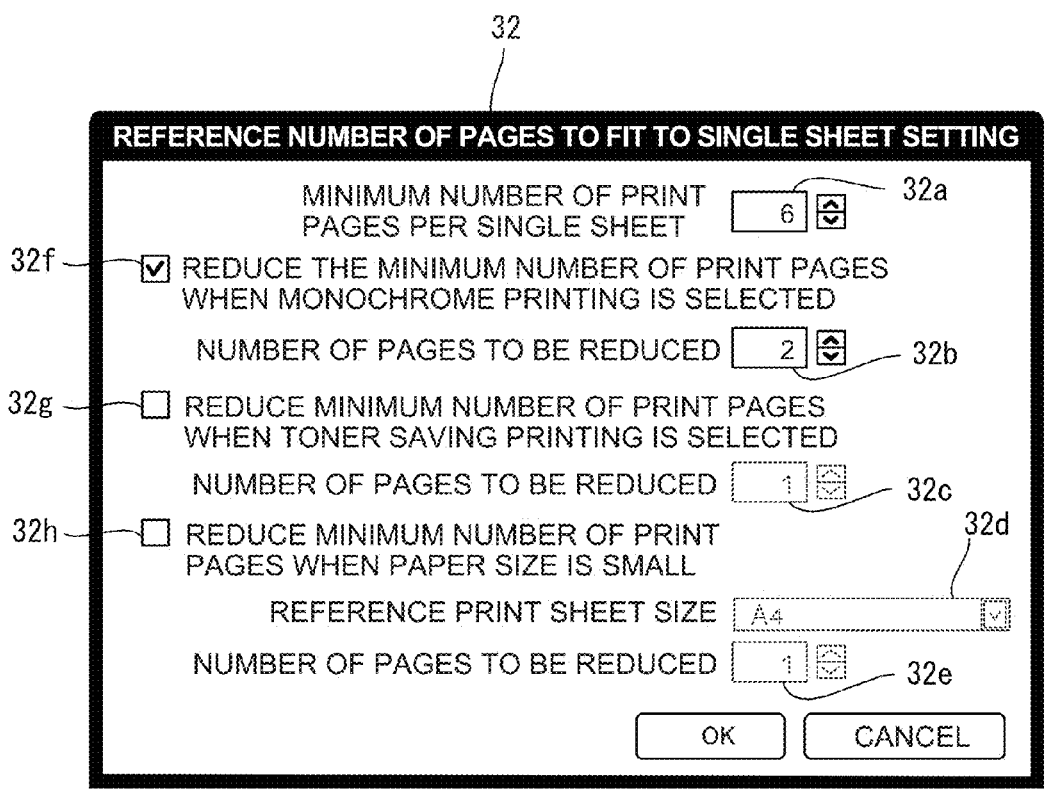
FIG. 7 is a schematic diagram depicting a setting screen to set a reference number of pages to fit to a single sheet.

As shown in FIG. 7, when the user clicks the administrator setting button 31g on the print option setting screen 31 described above, screen (not shown) which requests an administrator password is displayed. When the user enters the administrator password on the screen, the setting screen for the reference number of pages to fit to a single sheet 32 is displayed by the printer driver 23.

An entry field 32a in the setting screen for the reference number of pages to fit to a single sheet 32 is used for setting the condition of "minimum number of pages to fit to single sheet." The condition of "minimum number of pages to fit to single sheet" is the reference number of pages to fit to a single sheet. Numbers other than the number of pages to fit to a single sheet calculated on the basis of the setting values of the multiple-page print options may also be set in the entry field 32a. As shown in FIG. 7, 6 is set as the minimum number of print pages per single sheet. Numbers smaller than 1 may also be set in the entry field 32a.

A change condition is a condition for changing the reference number of pages to fit to a single sheet. Change information represents how the reference number of pages to fit to a single sheet is changed when the change condition is satisfied. The change information is set on the setting screen for the reference number of pages to fit to a single sheet 32. For example, the amount of usage of colorants and the print cost can be reduced depending on the setting values of the print options under some conditions even if the number of pages to fit to a single sheet are the same. Therefore, if the setting values with which the amount of usage of colorants and the print cost are reduced are set, the reference number of pages to fit to a single sheet is eased. When such setting values are set and the reference number of pages to fit to a single sheet is eased, an administrator sets the change condition and the change information on the setting screen for the reference number of pages to fit to a single sheet 32.

The condition of "reduce the minimum number of print pages when monochrome printing is selected" is a setting option of reducing the reference number of pages to fit to a single sheet when the change condition that monochrome is selected for the color/monochrome setting is satisfied. Monochrome printing is lower in print cost than color printing. By checking a checkbox 32f, the administrator sets this change condition. As shown in FIG. 7, since the checkbox 32f is checked, this change condition has been set. This change condition is a change condition that the number of colors equal to or smaller than a predetermined number has been set to the number of colors of colorants used for the printing of the page. Alternatively, a change condition of "increase the minimum number of print pages when color printing is selected" may be set.

An entry field 32b is a field used for setting the number of pages to be reduced. The number of pages to be reduced is the change information correlated with the change condition. The depicted change information represents that 2 is to be subtracted from the reference number of pages to fit to a single sheet.

The option of "reduce minimum number of print pages when toner saving printing is selected" is the setting option of reducing the reference number of pages to fit to a single sheet. This setting option is used when the change condition that the checkbox of the toner saving printing is checked is satisfied. Toner saving printing is lower in the amount of usage of colorants than normal printing. This change condition is a change condition that setting of reducing the amount of usage of colorants in printing of the page has been made. By checking a checkbox 32g, the administrator sets this change condition. Alternatively, a change condition of "increase the minimum number of print pages when the checkbox of the toner saving printing is unchecked" may be set.

An entry field 32c is a field used for setting the number of pages to be reduced. The number of pages to be reduced is the change information correlated with the change condition.

The option "reduce minimum number of print pages when paper size is small" is a setting option of reducing the reference number of pages to fit to a single sheet. When a change condition that the size equal to or smaller than the reference print sheet size has been designated is satisfied, the "reduce minimum number of print pages when paper size is small" is used. Since the page is reduced when printed if the print sheet size is small, the amount of usage of the colorants is small. This change condition is a change condition that the size equal to or smaller than a predetermined size has been set as the size of the print sheet used for printing the page. By checking a checkbox 32h, the administrator sets this change condition. Alternatively, a change condition of "increase the minimum number of print pages when large-sized paper sheet is selected" may be set.

An entry field 32*d* is a field for setting a reference print sheet size. The entry field 32*e* is a field used for setting the number of pages to be reduced. The number of pages to be reduced is change information correlated with the change condition.

(6) Process Carried Out When User Selects Setting Values of Multiple Pages Print Options An outline of the process carried out when the user selects setting values of multiple-page print options will be described and then the flowchart thereof will be described.

(6-1) Screen Display When User Selects Setting Values of Multiple Pages Print Options FIG. 8 shows a series of screens. The top screen shown in FIG. 8 is a screen which is displayed when the user selects setting values of multiple-page print options. The setting values are set as depicted in FIGS. 2 and 7. The print option setting values selected in FIG. 8 are as follows.

Color/monochrome printing: monochrome printing
Single/double-sided printing: single-sided printing
Print layout: 4 in 1
Reference number of pages to fit to a single sheet setting: minimum number of pages to fit to single sheet=6
Change condition: "reduce the minimum number of print pages when monochrome printing is selected"
Change information: 2

In this case, since monochrome printing is set as the setting value of the color/monochrome setting, the change condition of "reduce the minimum number of print pages when monochrome printing is selected" is satisfied. Therefore, the reference number of pages to fit to a single sheet is changed to 4 (=6−2). In this case, the number of pages to fit to a single sheet to be calculated is 4, which is equal to or greater than the reference number of pages to fit to a single sheet (=4).

Suppose that the user selects 9 in 1 as a setting value of the print layout in the example described above. In that case, the number of pages to fit to a single sheet to be calculated is 18, which is greater than reference number of pages to fit to a single sheet (=4). Therefore, 9 in 1 is set. On the contrary, suppose that the user selects 2 in 1 as the setting value of the print layout in an example described above. In that case, the number of pages to fit to a single sheet to be calculated is 2 as depicted in FIG. 5, which is smaller than the reference number of pages to fit to a single sheet (=4). Therefore, 2 in 1 is not set.

If the number of pages to fit to a single sheet is smaller than the reference number of pages to fit to a single sheet, the printer driver 23 determines whether there is, in other multiple-page print options used for the calculation of the number of pages to fit to a single sheet, any multiple-page print option of which number of pages to fit to a single sheet P1 to be calculated is equal to or greater than the reference number of pages to fit to a single sheet if the setting values of the multiple-page print options are changed. The printer driver 23 determines whether there is any other multiple-page print option which is equal to or greater than the reference number of pages to fit to a single sheet in accordance with the number of pages to fit to a single sheet P1 depicted in FIGS. 5 and 6. If it is determined that there is another multiple-page print option of which number of pages to fit to a single sheet P1 is equal to or greater than the reference number of pages to fit to a single sheet, the printer driver 23 causes a warning screen 33 to be displayed. On the warning screen 33, the other multiple-page print option, a current setting value of the other multiple-page print option, and a setting value candidate of multiple-page print options are displayed.

Suppose that the user selects 2 in 1 as the setting value of the print layout as shown in FIG. 8, if the setting value of the single/double-sided printing is changed into double-sided printing, the number of pages to fit to a single sheet P1 becomes greater than the reference number of pages to fit to a single sheet (=4) as depicted in FIG. 5. Therefore, the printer driver 23 determines that there is another multiple-page print option of which number of pages to fit to a single sheet P1 to be calculated becomes equal to or greater than the reference number of pages to fit to a single sheet if the setting value is changed. In this case, single/double-sided printing is displayed as another multiple-page print option, single-sided printing is displayed as the current setting value of single/double-sided printing, and double-sided printing is displayed as a setting value candidate on the warning screen 33.

If the user clicks an OK button 33*a* on the warning screen 33, the printer driver 23 sets 2 in 1 as the setting value of print layout and sets double-sided printing as the setting value of single/double-sided printing. Thereby, the user sets 2 in 1 in a range in which the number of pages to fit to a single sheet P1 become smaller than the reference number of pages to fit to a single sheet.

If the user clicks a cancel button 33*b* on the warning screen 33, the printer driver 23 does not set any selected setting value or a setting value candidate of other multiple-page print options on the print option setting screen 31. In this case, the screen returns to the print option setting screen 31.

Suppose that the user selects 1 in 1 as the setting value of the print layout in the example described above. In this case, the calculated number of pages to fit to a single sheet P1 even after the setting value of the single/double-sided printing option is changed into double-sided printing is 2, which is not equal to or greater than reference number of pages to fit to a single sheet (=4). In addition, there is no change condition for reducing the reference number of pages to fit to a single sheet. In this case, there is no other multiple-page print option of which number of pages to fit to a single sheet to be calculated becomes equal to or greater than the reference number of pages to fit to a single sheet if the setting value is changed and thus the warning screen 33 is not displayed. In this case, a message (not shown) that setting of the setting value is not accepted is displayed.

Figure 9:
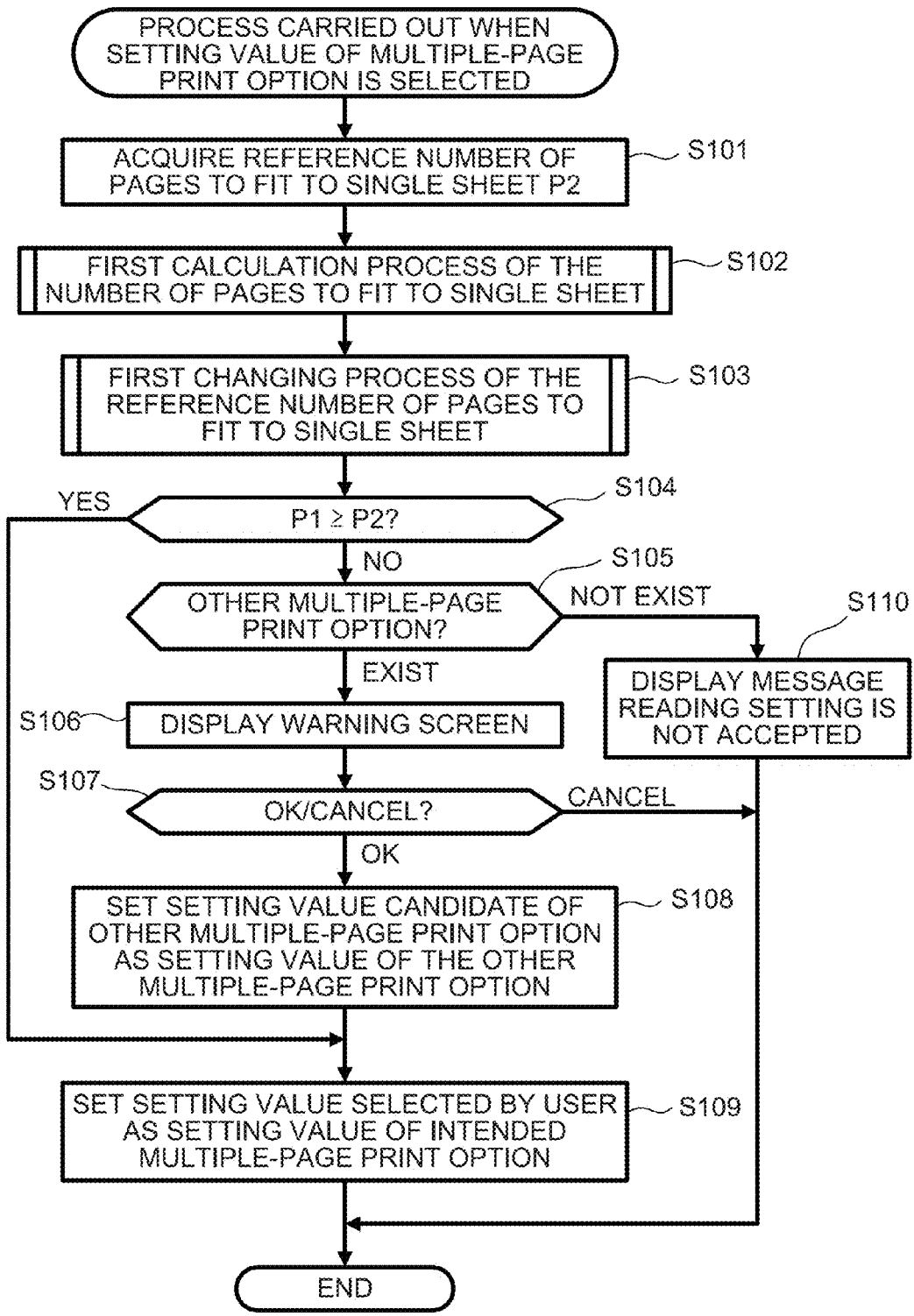
FIG. 9 is a flowchart depicting a process performed when setting values of multiple-page print options are selected.

(6-2) Process Performed When User Selects Setting Values of Multiple Pages Print Options A process shown in FIG. 9 is started each time the user changes the setting values of multiple-page print options 31*c* to 31*e* until the OK button 31*h* or the cancel button 31*i* on the print option setting screen 31 is pressed. In the subsequent description, the multiple-page print option of which setting value has been changed by the user is referred to as an intended multiple-page print option. This process is based on the premise that the number of pages to fit to a single sheet P1 is equal to or greater than the reference number of pages to fit to a single sheet before the setting values of multiple-page print options are selected.

In S101, the printer driver 23 acquires the number set in the setting field 32*a* of the "minimum number of pages to fit to single sheet" on the setting screen for the reference number of pages to fit to a single sheet 32 as the reference number of pages to fit to a single sheet P2. In S102, the printer driver 23 performs the first calculation process of a number of pages to fit to a single sheet. The first calculation process of the number of pages to fit to a single sheet is a process to calculate the number of pages to fit to a single sheet P1 using setting value selected by the user regarding the intended multiple-page print option and using the setting values currently set on the print option setting screen 31 regarding other multiple-page print options.

In S103, the printer driver 23 performs the first changing process of a reference number of pages to fit to a single sheet. The first changing process of reference number of pages to fit to a single sheet is a process to determine whether the change condition is satisfied regarding each change condition set on the setting screen for the reference number of pages to fit to a single sheet 32, and changes the reference number of pages to fit to a single sheet P2 in accordance with the change information correlated with the satisfied change condition. In S104, the printer driver 23 determines whether the number of pages to fit to a single sheet P1 calculated in S102 is equal to or greater than the reference number of pages to fit to a single sheet P2 after being changed in S103. If the number of pages to fit to a single sheet P1 is equal to or greater than the reference number of pages to fit to a single sheet P2, the process proceeds to S109. Otherwise, the process proceeds to S105.

In S105, the printer driver 23 determines whether there is, in the other multiple-page print options used for the calculation of the number of pages to fit to a single sheet P1, any multiple-page print option of which number of pages to fit to a single sheet P1 to be calculated becomes equal to or greater than the reference number of pages to fit to a single sheet P2 if the setting values of the multiple-page print options is changed.

Other multiple-page print options used for the calculation of the number of pages to fit to a single sheet P1 depend on the multiple-page print option for which the user has selected the setting value and depend on the current setting values of other multiple-page print options. For example, if the multiple-page print option for which the user has selected the setting value is print layout, single/double-sided printing is another multiple-page print option. If the multiple-page print option for which the user has selected the setting value is poster printing, single/double-sided printing is another multiple-page print option. If the multiple-page print option for which the user has selected the setting value is single/double-sided printing, print layout is another multiple-page print option when the setting value of poster printing is 1×1 and poster printing is another multiple-page print option when the setting value of poster printing is N×N.

If there is another multiple-page print option of which number of pages to fit to a single sheet P1 to be calculated becomes equal to or greater than the reference number of pages to fit to a single sheet P2, the printer driver 23 proceeds to S106. Otherwise, the printer driver 23 proceeds to S110.

In S106, the printer driver 23 causes the warning screen 33 which is depicted in FIG. 8 to be displayed on the display unit 13.

There may be multiple setting value candidates. For example, there is a case in which the current setting value of print layout is 2 in 1 and the number of pages to fit to a single sheet P1 becomes equal to or greater than the reference number of pages to fit to a single sheet P2 if the current setting value of the print layout is changed into any setting value of equal to or greater than 4 in 1. If there are multiple setting value candidates, the printer driver 23 causes the multiple setting value candidates to be displayed on the warning screen 33.

Alternatively, if there are multiple setting value candidates, the printer driver 23 may display only the setting value that is closest to the current setting value of the other multiple-page print option as the setting value candidate. For example, in a case in which the current setting value of the print layout is 2 in 1 and the number of pages to fit to a single sheet P1 becomes equal to or greater than the reference number of pages to fit to a single sheet P2 if the current setting value of the print layout is changed to a setting value of equal to or greater than 4 in 1, the printer driver 23 displays only 4 in 1 as the setting value candidate. In this process, only the setting value closest to the current setting value of other multiple-page print option is displayed as the setting value candidate.

In S107, if the OK button 33*a* is clicked on the warning screen 33, the printer driver 23 proceeds to S108 and, if the cancel button 33*b* is clicked, the printer driver 23 terminates this process. In S108, the printer driver 23 sets another setting value candidate of the multiple-page print option displayed on the warning screen 33 as a setting value of the other multiple-page print option on the print option setting screen 31.

In S109, the printer driver 23 sets the setting value selected by the user as the intended setting value of the multiple-page print option on the print option setting screen 31. In S110, the printer driver 23 causes a message to be displayed on the display unit 13 that setting of the selected setting value is not accepted.

(6-3) First Calculation Process of Number of Pages to Fit to Single Sheet

Figure 10:
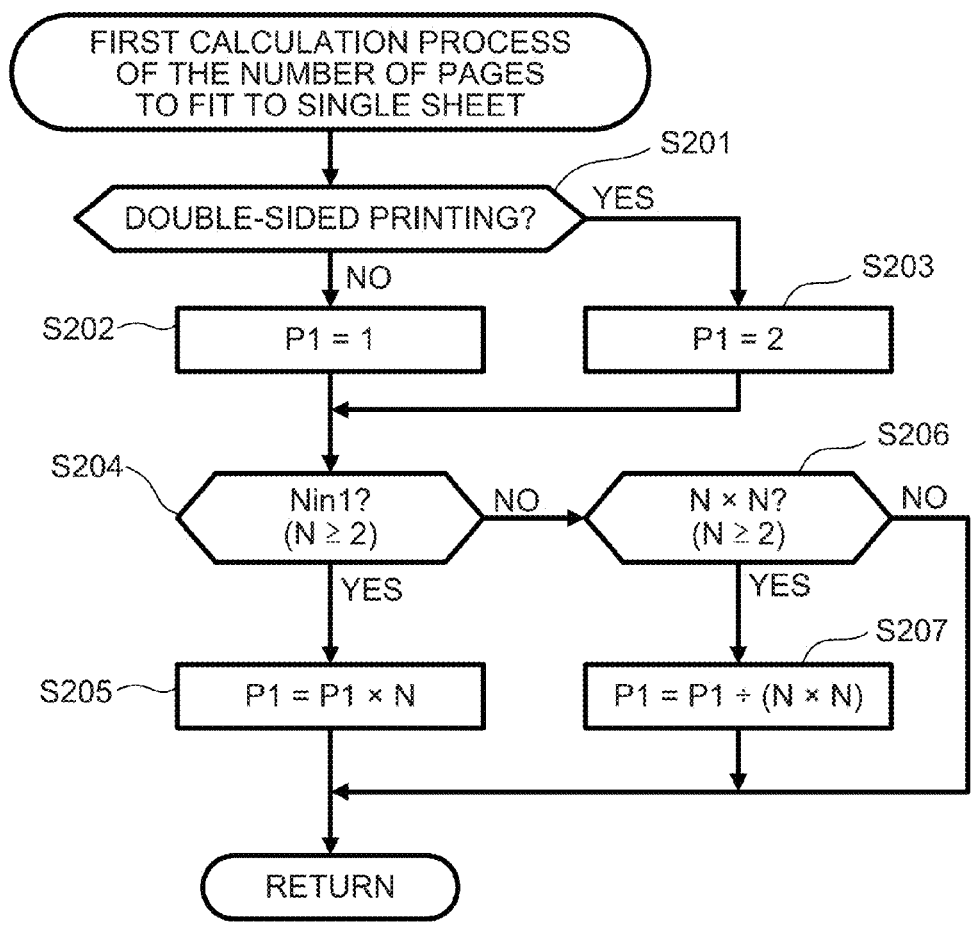
FIG. 10 is a flowchart depicting a first calculation process of a number of pages to fit to a single sheet.

In S201 of FIG. 10, the printer driver 23 determines whether the setting value of single/double-sided printing is double-sided printing. If the setting value is single-sided printing, the process proceeds to S202 and if double-sided printing, the process proceeds to S203.

In S202, the printer driver 23 sets the number of pages to fit to a single sheet P1 to 1. In S203, the printer driver 23 sets the number of pages to fit to a single sheet P1 to 2. In S204, the printer driver 23 determines whether the setting value of the print layout is N in 1 (N>=2). If the print layout is N in 1 (N>=2), the process proceeds to S205. If the print layout is not N in 1 (N>=2), that is, if the print layout is 1 in 1, the process proceeds to S206.

In S205, the printer driver 23 multiplies the number of pages to fit to a single sheet P1 by N. In S206, the printer driver 23 determines whether the setting value of the poster printing is N×N (N>=2). If the setting value is N×N (N>=2), the process proceeds to S207. Otherwise, that is, if the setting value is 1×1, the process is terminated. In S207, the printer driver 23 divides the number of pages to fit to a single sheet P1 by N×N.

(6-4) First Changing Process of Reference Number of Pages to Fit to Single Sheet In S301, the printer driver 23 determines whether a change condition of "reduce the minimum number of print pages when monochrome printing is selected" has been set. If the change condition has been set, the process proceeds to S302. Otherwise, the process proceeds to S304. In S302, the printer driver 23 determines whether monochrome is selected in the color/monochrome setting on the print option setting screen 31. If monochrome is selected, the change condition is satisfied and the process proceeds to S303. Otherwise, the change condition is not satisfied and the process proceeds to S304. In S303, the printer driver 23 subtracts the number of pages set as the number of pages to be reduced of the change condition from the reference number of pages to fit to a single sheet P2.

In S304, the printer driver 23 determines whether a change condition of "reduce minimum number of print pages when toner saving printing is selected" has been set. If the change condition has been set, the process proceeds to S305. Otherwise, the process proceeds to S307. In S305, the printer driver 23 determines whether the toner saving print has been checked on the print option setting screen 31. If the toner saving print has been checked, the change condition is satisfied and the process proceeds to S306. Otherwise, the change condition is not satisfied and the process proceeds to S307. In S306, the printer driver 23 subtracts the number of pages set as the number of pages to be reduced of the change condition from the reference number of pages to fit to a single sheet P2.

In S307, the printer driver 23 determines whether the change condition of "reduce minimum number of print pages when paper size is small" has been set. If the change condition of "reduce minimum number of print pages when paper size is small" has been set, the process proceeds to S308. Otherwise, the process is terminated. In S308, the printer driver 23 determines whether the print sheet size set on the print option setting screen 31 is equal to or smaller than the size set in the reference print sheet size of the change condition. If the print sheet size is equal to or smaller than the reference print sheet size, the change condition is satisfied and the printer driver 23 proceeds to S309. Otherwise, the change condition is not satisfied and the process is terminated. In S309, the printer driver 23 subtracts the number of pages set as the number of pages to be reduced of the change condition from the reference number of pages to fit to a single sheet P2.

(6-5) If Change Condition is No Longer Satisfied

In the case depicted in FIGS. 2 and 7, since monochrome printing is set as the setting value of the color/monochrome setting, the change condition of "reduce the minimum number of print pages when monochrome printing is selected" has been satisfied. Therefore, the reference number of pages to fit to a single sheet is changed to 4 (=6−2). Since the number of pages to fit to a single sheet P1 calculated in this example is 4, the number of pages to fit to a single sheet P1 is equal to or greater than the reference number of pages to fit to a single sheet P2 (=4).

However, if the user sets color for the color/monochrome setting in this state, the change condition described above is not satisfied: the reference number of pages to fit to a single sheet P2 remains 6 and the number of pages to fit to a single sheet P1 (=4) is smaller than the reference number of pages to fit to a single sheet P2 (=6). If, in this manner, the change condition is no longer satisfied, the following procedure is possible. When color is selected, the number of pages to fit to a single sheet P1 is calculated on the basis of the current setting value of the multiple-page print option. If the calculated number of pages to fit to a single sheet P1 is smaller than the reference number of pages to fit to a single sheet P2 (=6) after color is set, setting of color is not accepted.

Alternatively, regarding each multiple-page print option, the printer driver 23 displays, on the warning screen 33, a setting value candidate of which number of pages to fit to a single sheet P1 to be calculated becomes equal to or greater than the reference number of pages to fit to a single sheet P2 (=6) after color is set. When the user selects a setting value candidate, the printer driver 23 sets color and the setting value candidate on the print option setting screen 31.

(7) Advantageous Effect of Embodiment

According to the printer driver 23 of one or more aspect of the description described above, the printer driver 23 does not set the number of pages to fit to a single sheet if the number of pages to fit to a single sheet designated by the user is smaller than the reference number of pages to fit to a single sheet. Therefore, the amount of usage of consumable supplies, such as print sheets and colorants, is reduced. On the contrary, the printer driver 23 sets the number of pages to fit to a single sheet if the number of pages to fit to a single sheet designated by the user is equal to or greater than the reference number of pages to fit to a single sheet. Therefore, the degree of freedom in user setting is increased as compared with a configuration in which the number of pages to fit to a single sheet of print sheet is set automatically. According to the printer driver 23, the degree of freedom of setting the number of pages to fit to a single sheet of print paper is increased and, at the same time, the amount of usage of consumable supplies, such as print sheets and colorants, is reduced.

According to the printer driver 23, the setting values of multiple-page print options for calculating the number of pages to fit to a single sheet is designated instead of direct designation of the number of pages to fit to a single sheet.

According to the printer driver 23, when user selects the setting value of the multiple-page print option and if the number of pages to fit to a single sheet is smaller than the reference number of pages to fit to a single sheet, the warning screen 33 is displayed. The user is notified of another multiple-page print option of which number of pages to fit to a single sheet becomes equal to or greater than the reference number of pages to fit to a single sheet if the setting value is changed. Therefore, the user may easily understand that by changing which setting value of the setting values of multiple-page print options, the number of pages to fit to a single sheet becomes equal to or greater than the reference number of pages to fit to a single sheet.

According to the printer driver 23, a setting value candidate of another multiple-page print option of which number of pages to fit to a single sheet becomes equal to or greater than the reference number of pages to fit to a single sheet if the setting value is changed is displayed on the warning screen 33. When the user clicks the OK button 33a on the warning screen 33, the setting value displayed as the setting value candidate is set as the setting value of the other multiple-page print option. Therefore, the user may easily set a setting value with which the number of pages to fit to a single sheet is equal to or greater than the reference number of pages to fit to a single sheet.

According to the printer driver 23, the administrator sets the desired reference number of pages to fit to a single sheet. According to the printer driver 23, users other than the administrator are not able to set the reference number of pages to fit to a single sheet. Therefore, in one aspect, changing of the reference number of pages to fit to a single sheet by the users other than the administrator is disabled.

According to the printer driver 23, the reference number of pages to fit to a single sheet is changed automatically in accordance with satisfied change conditions. Therefore, the degree of freedom in setting of the number of pages is further increased.

According to the printer driver 23, by setting the change condition of "reduce the minimum number of print pages when monochrome printing is selected," the reference number of pages to fit to a single sheet is reduced when the number of colors of colorants used for the printing of the page is set to be equal to or smaller than the predetermined number.

According to the printer driver 23, by setting the change condition of "reduce minimum number of print pages when toner saving printing is selected," the reference number of pages to fit to a single sheet is reduced when setting to reduce the amount of usage of colorants used for printing of the page is made.

According to the printer driver 23, by setting the change condition of "reduce minimum number of print pages when paper size is small," the reference number of pages to fit to a single sheet is reduced when a size equal to or smaller than the predetermined size of the print sheet used for the printing of the page is set.

According to the printer driver 23, the administrator sets desired change conditions and change information. According to the printer driver 23, users other than the administrator are not able to change the change conditions and change information. Therefore, changing of the change conditions and change information by the users other than the administrator is disabled.

Second Embodiment

Figure 12:
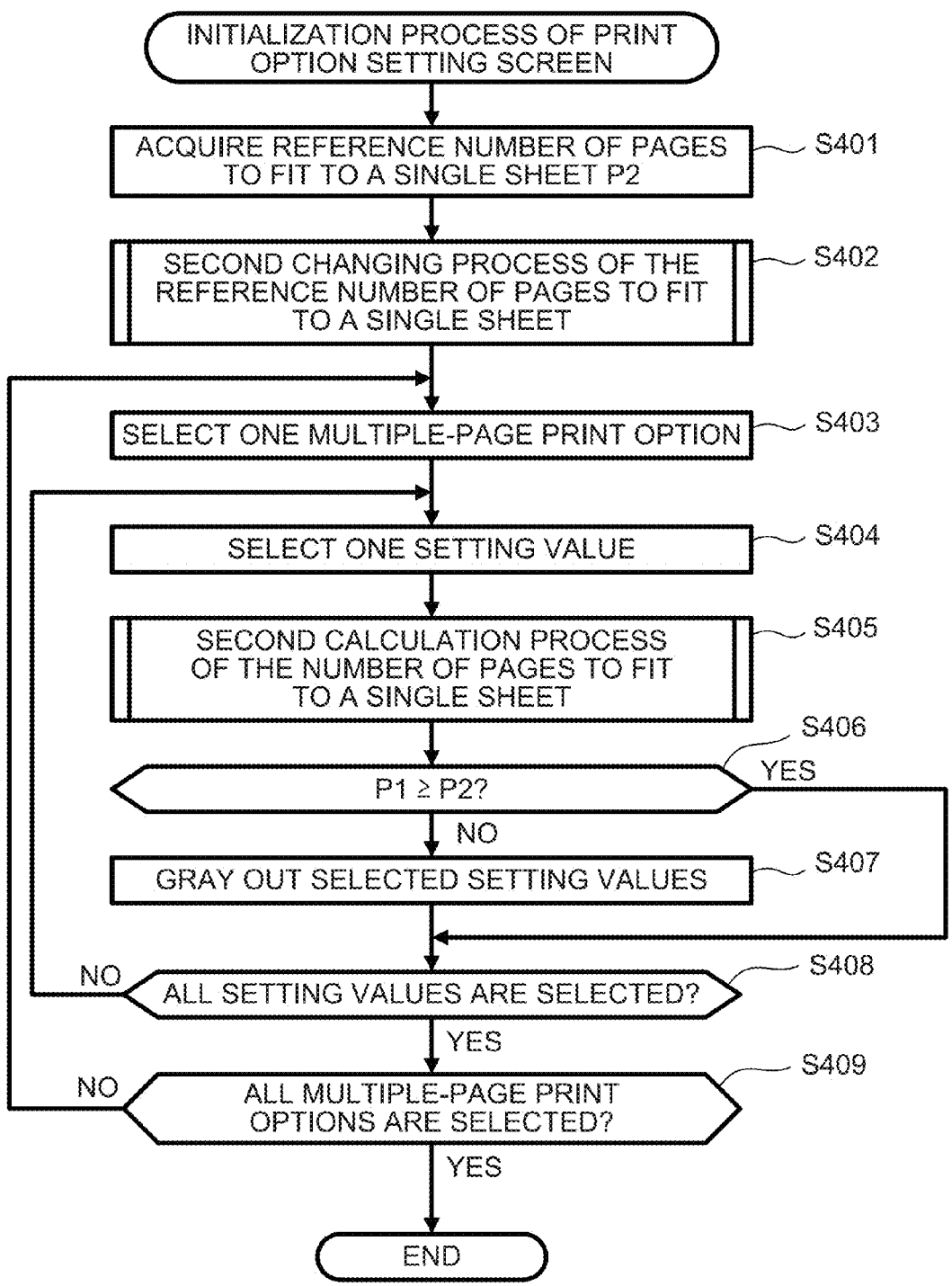
FIG. 12 is a flowchart depicting an initialization process of a print option setting screen according to one or more aspects of the disclosure.
Figure 13:
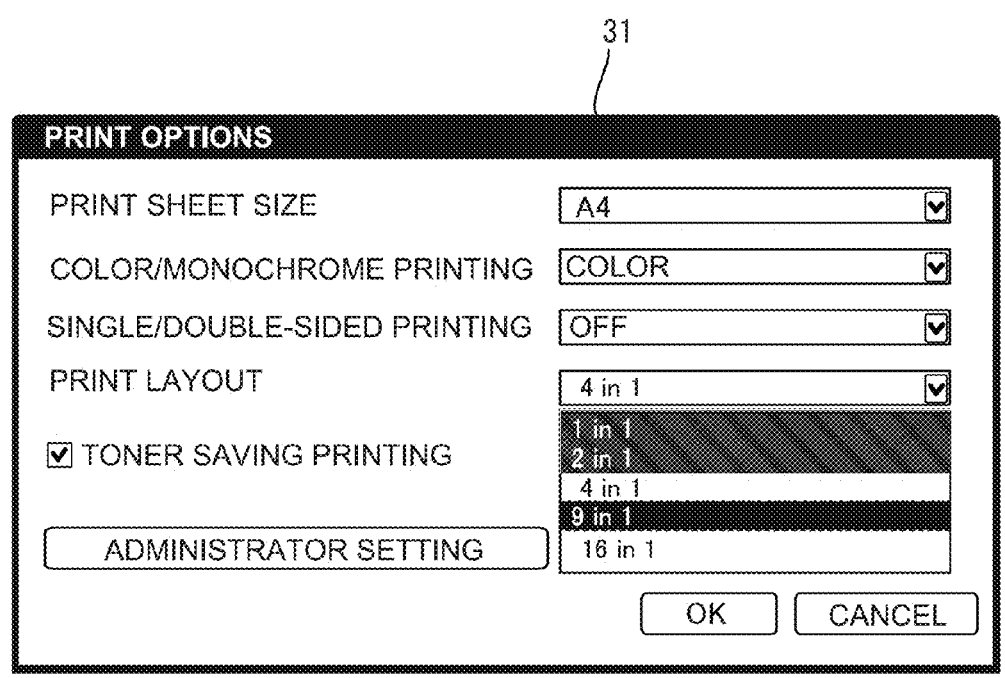
FIG. 13 is a schematic diagram depicting an example in which selection of a setting value on the print option setting screen is disabled.

Next, another aspect of the embodiment is described with reference to FIG. 12 to FIG. 14. The second embodiment may be used in combination with the first embodiment. A printer driver 23 according to the second embodiment performs an initialization process of a print option setting screen 31 when the print option setting screen 31 is displayed.

In this initialization process, regarding each multiple-page print option, the printer driver 23 previously limits selection of setting values, among setting values which are set to the multiple-page print option, with which the calculated number of pages to fit to a single sheet P1 is smaller than the reference number of pages to fit to a single sheet P2. In particular, the printer driver 23 calculates the minimum reference number of pages to fit to a single sheet P2 on the basis of the change information correlated with the change condition which the administrator had previously set to ON. If the number of pages to fit to a single sheet calculated by combining the setting value of a certain multiple-page print option and the setting value previously selected for another multiple-page print option is smaller than the minimum reference number of pages to fit to a single sheet P2, the printer driver 23 disables selection of the setting value. This process of disabling the setting value may be repeatedly performed for all the setting values of the multiple-page print options.

If all the change conditions to reduce the reference number of pages to fit to a single sheet, among the change condition set to ON by the administrator, are satisfied and if all the change conditions to increase the reference number of pages to fit to a single sheet, among the change condition set to ON by the administrator, are not satisfied, the reference number of pages to fit to a single sheet becomes the smallest value. The reference number of pages to fit to a single sheet becomes the minimum. If the user selects the setting values with which the number of pages to fit to a single sheet smaller than this calculated minimum reference number of pages to fit to a single sheet, such selection is disabled. For this reason, the printer driver 23 disables selection of those setting values in the initialization process of the print option setting screen 31.

(8) Outline of Initialization Process of Print Option Setting Screen

The printer driver 23 stores, in the storage unit 15 as the previously set values, the setting values which are set on the print option setting screen 31 when the print conditions were previously set. The previously set values may be used as default values when the print option setting screen 31 are initially displayed. When the print conditions are set for the first time, predetermined default values are used.

In S401, the printer driver 23 acquires the number set in the setting field 32a of "minimum number of pages to fit to single sheet" on the setting screen for the reference number of pages to fit to a single sheet 32 as the reference number of pages to fit to a single sheet P2. In S402, printer driver 23 performs the second changing process of the reference number of pages to fit to a single sheet. The second changing process of the reference number of pages to fit to a single sheet is a process to change the reference number of pages to fit to a single sheet P2 acquired in S401 to the minimum reference number of pages to fit to a single sheet calculated in accordance with the change information correlated with the change condition set to ON by the administrator.

In S403, the printer driver 23 selects one multiple-page print option for controlling the setting value. If the process of S403 is the second and subsequent times, one of unselected multiple-page print options is selected. In S404, the printer driver 23 selects one setting value which is set to the multiple-page print option selected in S403. If the process of S404 is the second and subsequent times, one of unselected setting values is selected.

In S405, the printer driver 23 performs a second calculation process of a number of pages to fit to a single sheet. In the first calculation process of the number of pages to fit to a single sheet, the number of pages to fit to a single sheet P1 is calculated using the setting value selected by the user regarding an intended multiple-page print option and using setting values currently set to the print options regarding other multiple-page print options. In the second calculation process of the number of pages to fit to a single sheet, the number of pages to fit to a single sheet P1 is calculated using the setting value selected in S404 regarding the multiple-page print option selected in S403 and using previously set values regarding other multiple-page print options. The second calculation process of the number of pages to fit to a single sheet is substantially the same as the first calculation process of the number of pages to fit to a single sheet in other aspects and, therefore, description thereof will be omitted.

In S406, the printer driver 23 determines whether the number of pages to fit to a single sheet P1 calculated in S405 is equal to or greater than the reference number of pages to fit to a single sheet P2 after being changed in S402. If the number of pages to fit to a single sheet P1 is smaller than the reference number of pages to fit to a single sheet P2, the process proceeds to S407. Otherwise, the process proceeds to S408.

In S407, the printer driver 23 disables selection of the setting value by graying out the setting value selected in S404 in the pull-down menu used for selection of the setting values of the multiple-page print option selected in S403. As shown in FIG. 13, 1 in 1 and 2 in 1 are grayed out. The method of disabling the selection of the setting values is not limited to graying out: other methods, such as hiding and shading, may also be used.

In S408, the printer driver 23 determines whether all the setting values that may be set to the multiple-page print options selected in S403 have been selected. If all the setting values have been selected, the process proceeds to S409. Otherwise, the process returns to S404 and is repeated. In S409, the printer driver 23 determines whether all the multiple-page print options have been selected. If all the multiple-page print options have been selected, this process is terminated. Otherwise, the process returns to S403 and is repeated.

(9) Second Changing Process of Reference Number of Pages to Fit to Single Sheet

Figure 11:
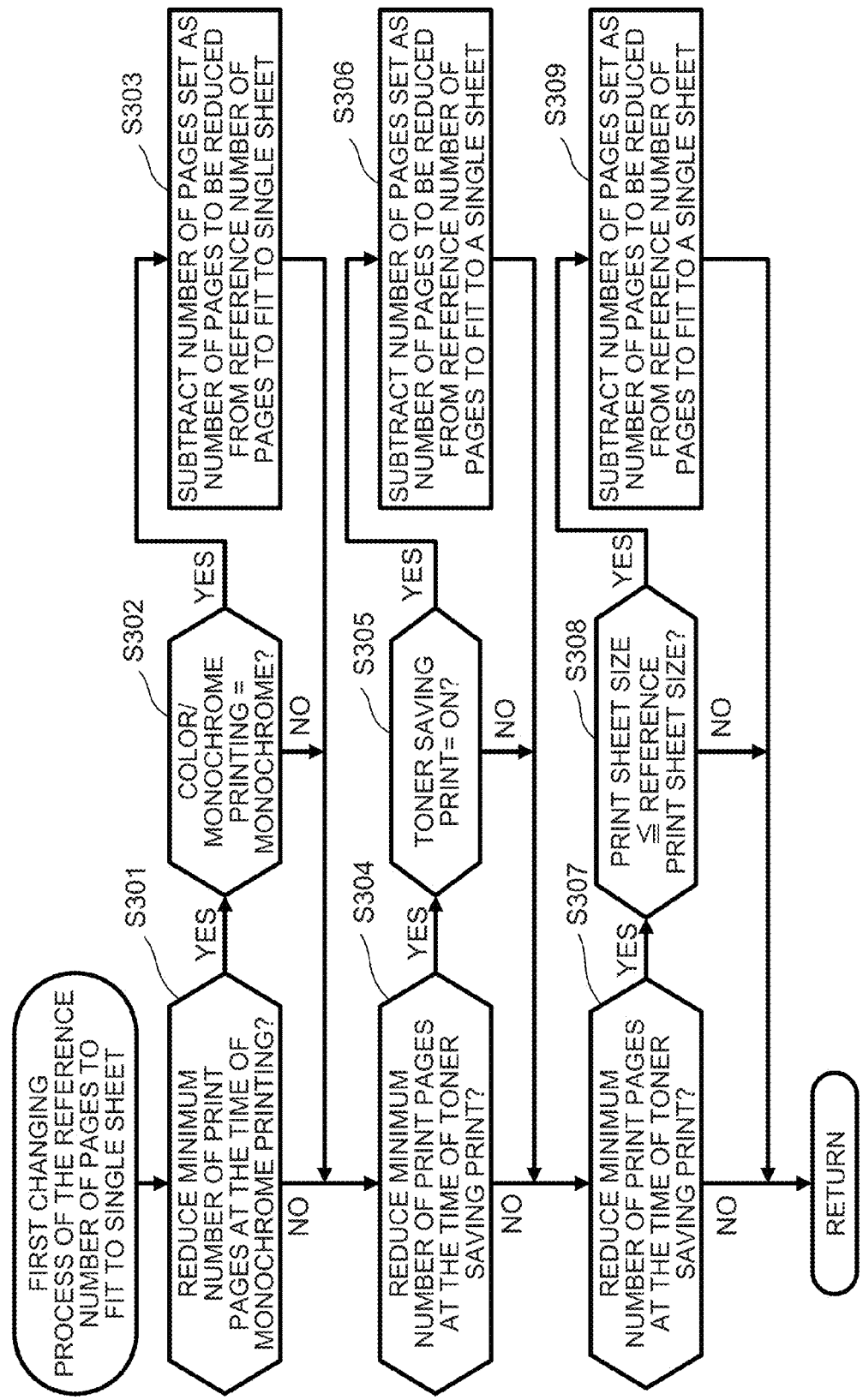
FIG. 11 is a flowchart depicting a first changing process of reference number of pages to fit to a single sheet.
Figure 14:
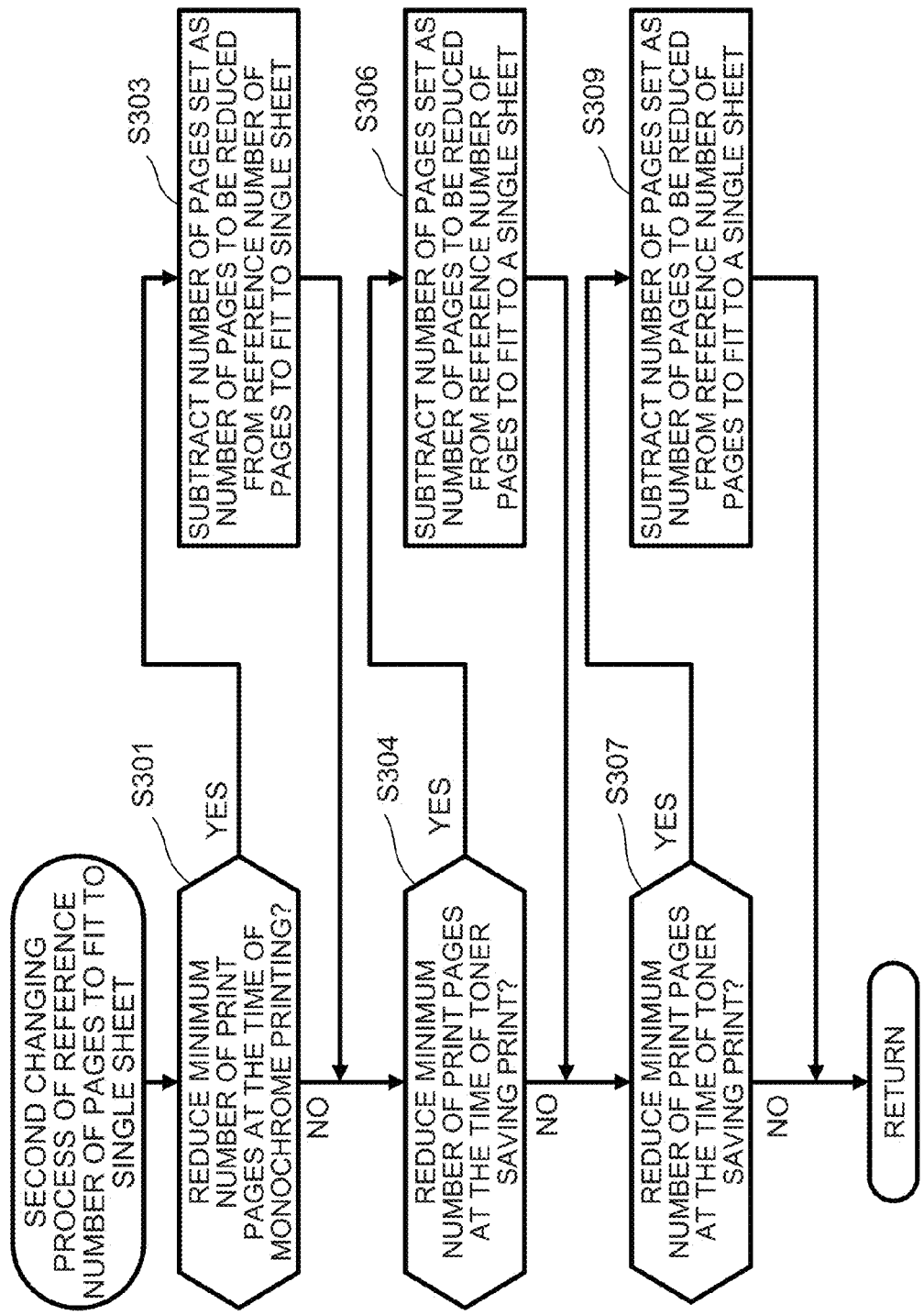
FIG. 14 is a flowchart depicting a second changing process of reference number of pages to fit to a single sheet.

Processes of FIG. 14 which are the same as those of the first changing process of the reference number of pages to fit to a single sheet of FIG. 11 are denoted by the same reference numerals and description thereof will be omitted.

The second changing process of the reference number of pages to fit to a single sheet is a process similar to the first changing process of the reference number of pages to fit to a single sheet, but determination of whether the change conditions have been satisfied is excluded (S302, S305 and S308).

Since the change condition set in the second embodiment is only the change condition to reduce the reference number of pages to fit to a single sheet as in the first embodiment and the change condition to reduce the reference number of pages to fit to a single sheet has already been satisfied, determination of whether the change condition is satisfied is unnecessary.

Regarding the change condition to increase the reference number of pages to fit to a single sheet, among the change conditions set to ON by the administrator, in the second changing process of the reference number of pages to fit to a single sheet, all the changing conditions are not satisfied. If the change conditions are not satisfied, the change information is not applied. Even if there is a change condition to increase the reference number of pages to fit to a single sheet, determination of whether the reference number of pages to fit to a single sheet has been set to ON by the administrator is unnecessary. It is not necessary to determine the change conditions to increase the reference number of pages to fit to a single sheet in the second of the reference number of pages to fit to a single sheet changing process.

(10) Example of Initialization Process of Print Option Setting Screen

The following example will be described.
Previous single/double-sided printing: single-sided printing
Previous print layout: 2 in 1
Previous poster printing: 1×1
Minimum number of pages to fit to single sheet: 4
Change condition: reduce the minimum number of print pages when monochrome printing is selected
Change information: 2

In this case, the reference number of pages to fit to a single sheet P2 is changed to 2 (=4−2). The change condition of "reduce the minimum number of print pages when monochrome printing is selected" is satisfied. The number of pages represented by the change information (=2) is subtracted from the reference number of pages to fit to a single sheet P2 (=4) before the change. This reference number of pages to fit to a single sheet P2 is the minimum reference number of pages to fit to a single sheet P2 in the range of the set change condition and change information, and the reference number of pages to fit to a single sheet P2 does not become smaller than 2 in this range.

Regarding single/double-sided printing, if the setting value of the other multiple-page print option is the same as the previously set value, the number of pages to fit to a single sheet P1 to be calculated is equal to or greater than the reference number of pages to fit to a single sheet P2 after being changed (=2) regardless of whether single-sided printing is selected or double-sided printing is selected. Therefore, these setting values are not grayed out.

Regarding print layout, if the setting value of the other multiple-page print option is the same as the previously set value, the number of pages to fit to a single sheet P1 is 1, when 1 in 1 is selected, which is smaller than the reference number of pages to fit to a single sheet P2 after being changed (=2). Therefore, 1 in 1 is grayed out. 2 in 1 and subsequent setting values are not grayed out: the number of pages to fit to a single sheet related to these setting values become equal to or greater than 2.

Regarding poster printing, when 1×1 is selected, the number of pages to fit to a single sheet P1 is 2, which is equal to or greater than the reference number of pages to fit to a single sheet P2 (=2) after being changed. However, regarding each setting value N×N (N>=2), the number of pages to fit to a single sheet P1 is smaller than 1. Therefore, all N×N (N>=2) are grayed out.

(11) Release Limitation in Selection

In the example described above, double-sided printing is not grayed out in the initialization process of the print option setting screen 31. The user changes the setting value of single/double-sided printing into double-sided printing. If the setting value of single/double-sided printing is changed to double-sided printing, the calculated number of pages to fit to a single sheet P1 (=2) becomes equal to or greater than the reference number of pages to fit to a single sheet P2 (=2) even if 1 in 1 is selected as the setting value of print layout. Selection of 1 in 1 should be accepted in that case.

The printer driver 23 does not limit selection of all the multiple-page print options in a case in which the user changes any setting value of the multiple-page print option from the previously set value after the initialization process of the print option setting screen 31 is terminated. Selection of the setting value should not be limited in such a case since an assumption that the setting value of the multiple-page print option is the same as the previously set value is not established for each multiple-page print option. The setting value for which limitation on selection is released in accordance with the changed setting value is determined independently.

(12) Advantageous Effect of Embodiment

According to the printer driver 23 of the second embodiment, the initialization process of the print option setting screen 31 can initially disable, e.g., set to non-selectable, the user operation to designate a setting value with which the number of pages to fit to a single sheet P1 becomes smaller than the reference number of pages to fit to a single sheet P2. Accordingly, unnecessary user operation of selecting setting values which do not satisfy the conditions of equal to or greater than the reference number of pages to fit to a single sheet P2 may be omitted.

Third Embodiment

Next, a yet another aspect of the embodiment is described with reference to FIG. 15. When the user carries out an operation to display a pull-down menu for the selection of a setting value of a multiple-page print option, the printer driver 23 performs an initialization process of the pull-down menu before the pull-down menu is displayed. In this initialization process, the printer driver 23 disables selection of the setting values with which the calculated number of pages to fit to a single sheet P1 becomes smaller than the reference number of pages to fit to a single sheet P2.

(13) Initialization Process of Pull-Down Menu

A process shown in FIG. 15 is performed at each time of operation to display the pull-down menu of the multiple-page print option. The multiple-page print option to which user operation to display the pull-down menu has been performed is referred to as an intended multiple-page print option.

In S601, the printer driver 23 acquires the number set in "minimum number of pages to fit to single sheet" on the setting screen for the reference number of pages to fit to a single sheet 32 as the reference number of pages to fit to a single sheet P2.

In S602, the printer driver 23 performs the first changing process of the reference number of pages to fit to a single sheet described in the first embodiment. The first changing process of the reference number of pages to fit to a single sheet is a process to determine whether the change condition is satisfied regarding each change condition set on the setting screen for the reference number of pages to fit to a single sheet 32, and change the reference number of pages to fit to a single sheet P2 in accordance with the change information correlated with the satisfied change condition.

In S603, the printer driver 23 selects one setting value from among the setting values which may be set to the intended multiple-page print option. If the process of S603 is the second and subsequent times, one of unselected setting values is selected.

In S604, the printer driver 23 performs a third calculation process of the number of pages to fit to a single sheet. In the first calculation process of the number of pages to fit to a single sheet, the number of pages to fit to a single sheet P1 is calculated using the setting value selected by the user regarding a target multiple-page print option and using setting values currently set to the print options regarding other multiple-page print options. In the third calculation process of the number of pages to fit to a single sheet, the number of pages to fit to a single sheet P1 is calculated using the setting value selected in S603 regarding an intended multiple-page print option and using setting values currently set on the print option setting screen 31 regarding other multiple-page print options. The third calculation process of the number of pages to fit to a single sheet is substantially the same as the first calculation process of the number of pages to fit to a single sheet in other aspects and, therefore, description thereof will be omitted.

In S605, the printer driver 23 determines whether the number of pages to fit to a single sheet P1 calculated in S604 is equal to or greater than the reference number of pages to fit to a single sheet P2 after being changed in S602. If the number of pages to fit to a single sheet P1 is smaller than the reference number of pages to fit to a single sheet P2, the process proceeds to S606. Otherwise, the printer driver 23 proceeds to S607. If the value selected in S603 is grayed out, the printer driver 23 makes the value selectable.

In S606, the printer driver 23 disables selection of the setting value by graying out the setting value selected in S603 in the pull-down menu of the intended multiple-page print option.

In S607, the printer driver 23 determines whether all the setting values that may be set to the intended multiple-page print option have been selected. If all the setting values have been selected, the process is terminated. Otherwise, the process returns to S603 and is repeated.

After the initialization process of the pull-down menu described above, when the user selects a setting value with the pull-down menu, the printer driver 23 sets the selected setting value on the print option setting screen 31.

(14) Example of Initialization Process of Pull-Down Menu

The following example will be described.
Single/double-sided printing: double-sided printing
Print layout: 4 in 1
Poster printing: 1×1
Minimum number of pages to fit to single sheet: 8
Change condition: None
The number of pages to fit to a single sheet P1 (=8) is equal to or greater than the reference number of pages to fit to a single sheet P2 (=8). The user wants to select single-sided printing and carries out operation to display a pull-down menu of single/double-sided printing. However, if single-sided printing is selected, the calculated number of pages to fit to a single sheet P1 (=4) is smaller than the reference number of pages to fit to a single sheet P2 (=8). Therefore, single-sided printing is grayed out by the initialization process of the pull-down menu and selection of single-sided printing is disabled.

The user changes the setting value of the print layout into 9 in 1. Since the number of pages to fit to a single sheet P1 of 9 in 1 (=18) is greater than the reference number of pages to fit to a single sheet P2 (=8), the user selects 9 in 1. The user then operates to display the pull-down menu of the single/double-sided printing. If the setting value of the print layout is changed to 9 in 1, the number of pages to fit to a single sheet P1 (=9) becomes greater than the reference number of pages to fit to a single sheet P2 (=8) even if single-sided printing is selected. Thereafter, when the user displays the pull-down menu of single/double-sided printing, the gray out of the single-sided printing is released by the initialization process of the pull-down menu. Therefore, the user selects single-sided printing in the range in which the number of pages to fit to a single sheet P1 does not become smaller than the reference number of pages to fit to a single sheet P2.

(15) Advantageous Effect of Embodiment

According to the printer driver 23 of the third embodiment, the user is not able to select a setting value with which the number of pages to fit to a single sheet P1 is smaller than the reference number of pages to fit to a single sheet P2. Therefore, the amount of usage of print sheets to which the page is fit is reduced. According to printer driver 23, the setting value with which the number of pages to fit to a single sheet P1 is equal to or greater than the reference number of pages to fit to a single sheet P2 is selected. Therefore, the degree of freedom in setting may be increased as compared with a configuration in which the number of pages to fit to a single sheet of print sheet is set automatically. According to the printer driver 23, the degree of freedom of setting the number of pages to fit to a single sheet of print paper may be increased and, at the same time, the amount of usage of consumable supplies may be reduced.

Other Embodiments

The embodiments are not limited to the description provided above with reference to the drawings; the following embodiments may be included in the technical scope of the present invention.

(1) In the embodiments described above, designation of the number of pages to fit to a single sheet is received by receiving selection of the setting value of the multiple-page print option. However, designation of the number of pages to fit to a single sheet may be received by receiving input of the number from the user. If the double-sided printing function or the poster printing function is not provided, the setting value of the print layout option may be the number of pages to fit to a single sheet.

(2) In the first embodiment, it is determined whether there is, in other multiple-page print options used for the calculation of the number of pages to fit to a single sheet, any multiple-page print option of which number of pages to fit to a single sheet P1 to be calculated is equal to or greater than the reference number of pages to fit to a single sheet P2 if the setting values of the multiple-page print options are changed.

Other multiple-page print option in this case do not include any intended multiple-page print option. However, an intended multiple-page print option may also be included.

For example, suppose that a current setting value of single/double-sided printing is double-sided printing and that the user has selected single-sided printing as the setting value of single/double-sided printing. Suppose that, if single-sided printing is selected, the number of pages to fit to a single sheet P1 becomes smaller than the reference number of pages to fit to a single sheet P2. In this case, the printer driver 23 causes double-sided printing to be displayed on a warning screen 33 as a setting value candidate of single/double-sided printing. If there is a change condition set to ON, among the change conditions to reduce the number of minimum print pages on the setting screen for the reference number of pages to fit to a single sheet 32, and no setting option has been set on the print option setting screen 31, a message to recommend that the user set the setting option is displayed on the warning screen 33.

(3) In the first embodiment, determination of whether the number of pages to fit to a single sheet P1 is equal to or greater than the reference number of pages to fit to a single sheet P2 is made when the user selects the setting value of the multiple-page print option. Additionally, this determination is made when the user clicks the OK button on the print option setting screen 31. In this case, if the number of pages to fit to a single sheet P1 becomes smaller than the reference number of pages to fit to a single sheet P2, the printer driver 23 obtains, for each multiple-page print option, a setting value candidate of another multiple-page print option with which the calculated number of pages to fit to a single sheet P1 becomes equal to or greater than the reference number of pages to fit to a single sheet P2. The printer driver 23 causes a combination of a multiple-page print option and a setting value candidate of the other multiple-page print option to be displayed on the warning screen 33. In this case, setting of the setting value does not correspond to causing the selected setting value to be displayed on the print option setting screen 31, but corresponds to writing the setting value displayed on the print option setting screen 31 in a predetermined area of the RAM 12 as the print condition described above.

(4) In the second embodiment, in the initialization process of the print option setting screen 31, when the number of pages to fit to a single sheet calculated from the combination of the setting value of a certain multiple-page print option and the setting value previously selected for other multiple-page print option is smaller than the minimum reference number of pages to fit to a single sheet P2, selection of the setting value is disabled. Alternatively, the number of pages to fit to a single sheet is calculated for all the possible combinations of the setting value of a certain multiple-page print option and the setting value which can be set for the other multiple-page print option. If the calculated number of pages to fit to a single sheet is smaller than the minimum reference number of pages to fit to a single sheet P2, the setting value of a certain multiple-page print option is disabled.

For example, the following example will be described.
Minimum number of pages to fit to single sheet: 6
Change condition: reduce the minimum number of print pages when monochrome printing is selected
Change information: 2

In this case, if the change condition is satisfied, the reference number of pages to fit to a single sheet P2 after being changed is 4 (=6−2). 4 may be the minimum reference number of pages to fit to a single sheet P2, and even if the change condition is satisfied, the reference number of pages to fit to a single sheet P2 does not become smaller than 4.

Regarding 1 in 1 which is the setting value of the print layout, the number of pages to fit to a single sheet P1 is 1 if single-sided printing is set as the setting value, and the number of pages to fit to a single sheet P1 is 2 if double-sided printing is set as the setting value of the single/double-sided printing which is the other multiple-page print option. Even if monochrome is set as the setting value of color/monochrome printing and double-sided printing is set for single/double-sided printing, the number of pages to fit to a single sheet P1 cannot become equal to or greater than the reference number of pages to fit to a single sheet P2. 1 in 1 is the setting value that is not able to be set and is grayed out.

Regarding 2 in 1, on the contrary, if monochrome is set as the setting value for color/monochrome printing and double-sided printing is set for single/double-sided printing, the number of pages to fit to a single sheet P1 (=4) becomes equal to or greater than the reference number of pages to fit to a single sheet P2 (=4). Regarding single-sided printing, if monochrome is set as the setting value for color/monochrome printing and 4 in 1 is set for print layout, the number of pages to fit to a single sheet P1 (=4) becomes equal to or greater than the reference number of pages to fit to a single sheet P2 (=4). These setting values may or may not be the values which are not able to be set. Therefore, 2 in 1 is not grayed out.

In the initialization process of the print option setting screen 31, selection of only setting values that are obviously not be able to be set is disabled. If selection of only setting values that are not being able to be set is disabled, limitation on selection is not necessarily released even if the setting value of the multiple-page print option is changed from the previously set value. The number of pages to fit to a single sheet P1 cannot become equal to or greater than the reference number of pages to fit to a single sheet P2 even if any setting values of the print options are changed.

(5) In one embodiment, the reference number of pages to fit to a single sheet P2 is not displayed on the print option setting screen 31. Alternatively, the reference number of pages to fit to a single sheet P2 in accordance with currently satisfied change condition is displayed on the print option setting screen 31. In that case, the user may easily select a setting value with which the number of pages to fit to a single sheet P1 becomes equal to or greater than the reference number of pages to fit to a single sheet P2.

(6) The PC 1 is an example of an information processing apparatus in one or more of the embodiments. However, the information processing device may be any image processing device which has at least the print function, scanner function, copy function, direct print function and facsimile function. In this case, the control unit included in the information processing apparatus is a processing unit. The information processing apparatus performs the process of the present embodiment by combinations of multiple CPUs. The control unit of the image processing device may be constituted by combinations of one or more CPUs, ASICs, or combinations of the CPU and the ASIC. The information processing apparatus may be a mobile phone, a handheld terminal or other devices.

(7) Alternatives for setting whether the reference number of pages to fit to a single sheet may be displayed on the setting screen for the reference number of pages to fit to a single sheet 32. In this case, if it has been set that reference number of pages to fit to a single sheet is not to be set, setting in the setting fields 32a to 32e are disabled. The disabled setting may be displayed by, for example, gray out. If the reference number of pages to fit to a single sheet is to be set is ON, the administrator inputs values in the setting fields 32a to 32e.

(8) According to the embodiments, single/double-sided printing, print layout and poster printing are described as multiple-page print options. At least one or more of these multiple-page print options is included. These setting options are not restrictive. Any setting option with which pages are to fit to a sheet, such as bookbinding print (2 pages are fit to each of both sides of a print sheet to create a book by saddle stitch binding) may be used.

(9) According to the embodiments, if it is determined that the number of pages to fit to a single sheet is equal to or greater than the reference number of pages to fit to a single sheet, the number of pages to fit to a single sheet selected by the user is set. On the contrary, if it is determined that the number of pages to fit to a single sheet is smaller than the reference number of pages to fit to a single sheet, the number of pages to fit to a single sheet is not set. It is also possible that, if it is determined that the number of pages to fit to a single sheet is greater than the reference number of pages to fit to a single sheet, the number of pages to fit to a single sheet selected by the user is set. On the contrary, if the number of pages to fit to a single sheet is equal to or smaller than the reference number of pages to fit to a single sheet, the number of pages to fit to a single sheet is not set.

(10) In the first embodiment, when the user selects the setting value of the multiple-page print option on the print option setting screen 31, the process depicted in FIG. 9 is performed. Additionally, this process is performed when the setting value of a print option other than the multiple-page print option, such as print sheet size, color/monochrome printing and toner saving setting, is selected. If this process is performed when the setting value of print sheet size, color/monochrome printing or toner saving setting is selected, since the intended multiple-page print option described in the first embodiment is not specified uniformly, this process is performed by selecting the single/double-sided printing, print layout and poster printing one at a time as the intended multiple-page print option. In this case, the no change conditions become unsatisfied after this process is performed.

(11) In the first embodiment, a case has been described in which, in the process in which the setting value of the multiple-page print option depicted in FIG. 9 is selected, the print sheet size, color/monochrome printing and toner saving setting are not included in other multiple-page print option. However, when the setting value of any of the print options, including the single/double-sided printing, print layout and poster printing, is selected, the number of pages to fit to a single sheet P1 is calculated for all the combinations of the setting values of other print options, the reference number of pages to fit to a single sheet P2 is changed, and a setting value candidate of other print option with which the calculated number of pages to fit to a single sheet P1 becomes equal to or greater than the reference number of pages to fit to a single sheet P2 after being changed is displayed. Here, the setting value of the print option for which the setting value has been selected is fixed to the selected setting value.

(12) In one embodiment, a case in which double-sided printing is set even in poster printing has been described. It is not desirable for some users, however, that divided pieces of a single page are printed on both sides of a print sheet. Thus, double-sided printing may not always be set when N×N is set for poster printing.

What is claimed is:

1. An information processing apparatus comprising:
a controller configured to:
receive a desired number of pages to fit to a single sheet;
determine whether the received desired number of pages is equal to or greater than a predetermined reference number of pages to fit to a single sheet;
set a number of pages to fit to a single sheet to the received desired number of pages if the received desired number of pages is equal to or greater than the predetermined reference number of pages;
display an error screen if the received desired number of pages is less than the predetermined reference number of pages;
receive a desired setting value for a multiple-page print option for calculating the number of pages;
determine the number of pages on the basis of the desired setting value;
determine whether the calculated number of pages is equal to or greater than the predetermined reference number of pages; and
use the desired setting value for the multiple-page print option, if the calculated number of pages is equal to or greater than the predetermined reference number of pages.

2. The information processing apparatus according to claim 1, wherein the controller is further configured to:
determine whether there is any multiple-page print option of which the calculated number of pages becomes equal to or greater than the predetermined reference number if the setting value is changed when the calculated number of pages is smaller than the predetermined reference number of pages; and
display the multiple-page print option when there is any multiple-page print option of which the calculated number of pages becomes equal to or greater than the predetermined reference number if the setting value is changed.

3. The information processing apparatus according to claim 2, wherein the controller is further configured to:
display one or more setting values which can be set for the multiple-page print option and with which the calculated number of pages becomes equal to or greater than the predetermined reference number of pages;
receive selection of one of the one or more displayed setting values; and
use the one selected displayed setting value for the multiple-page print option.

4. The information processing apparatus according to claim 1, wherein the controller is further configured to receive the predetermined reference number of pages.

5. The information processing apparatus according to claim 1, wherein the controller is further configured to:
determine whether a change condition is satisfied, wherein the change condition is used for changing the predetermined reference number of pages and the change condition is associated to change information which determines a changed value of the predetermined reference number of pages; and
change the predetermined reference number of pages to the changed value of the predetermined reference number of pages if the change condition is satisfied.

6. The information processing apparatus according to claim 5, wherein the controller is further configured to:
acquire a desired minimum reference number of pages to fit to a single sheet;
perform second changing process to:
calculate actual minimum reference number;
change the desired minimum reference number to the actual minimum reference number; and
display as selectable one or more setting values for one or more multiple print options, each of the setting values determines a number of pages to fit to a single sheet equal to or greater than the actual minimum reference number.

7. The information processing apparatus according to claim 5, wherein the change condition is that a number of colors equal to or smaller than a predetermined number are set to the number of colors of colorant used for print of the page, and the change information is information representing the number of pages to be reduced from the predetermined reference number of pages.

8. The information processing apparatus according to claim 5, wherein the change condition is that setting to reduce the amount of usage of colorant used for printing of the page is performed, and the change information is information representing the number of pages to be reduced from the predetermined reference number of pages.

9. The information processing apparatus according to claim 5, wherein the change condition is that a size equal to or smaller than a predetermined size is set to the size of a sheet used for printing of the page, and the change information is information representing the number of pages to be reduced from the predetermined reference number of pages.

10. The information processing apparatus according to claim 5, wherein the controller is further configured to receive at least one of the change condition and the change information.

11. An information processing apparatus comprising:
a controller configured to:
  display as selectable one or more numbers of pages to fit to a single sheet, each of the numbers equal to or greater than a predetermined reference number of pages to fit to a single sheet;
  receive, as a selected number of pages to fit to a single sheet, one of the one or more selectable numbers of pages;
  set the received number of pages to the selected number of pages to fit to a single sheet; and
  display as not-selectable one or more numbers of pages to fit to the single sheet, each of the non-selectable numbers of pages is smaller than the predetermined reference number of pages.

12. The information processing apparatus according to claim 11, wherein the controller is further configured to:
  receive a setting value of a multiple-page print option for calculating the number of pages;
  calculate the number of pages on the basis of the setting value; and
  display as not-selectable one or more numbers of pages to fit to the single sheet, a setting value of a multiple-page print option which has the calculated number of pages smaller than the predetermined reference number of pages.

13. A non-transitory computer readable storage medium storing instructions, when executed, cause an information processing apparatus to perform:
  receiving a desired number of pages to fit to a single sheet;
  determining whether the received desired number of pages is equal to or greater than a predetermined reference number of pages to fit to a single sheet;
  setting a number of pages to fit to a single sheet to the received desired number of pages if the received desired number of pages is equal to or greater than the predetermined reference number of pages;
  displaying an error screen if the received desired number of pages is less than the predetermined reference number of pages;
  receiving a desired setting value for a multiple-page print option for calculating the number of pages;
  determining the number of pages on the basis of the desired setting value;
  determining whether the calculated number of pages is equal to or greater than the predetermined reference number of pages; and
  using the desired setting value for the multiple-page print option, if the calculated number of pages is equal to or greater than the predetermined reference number of pages.

14. A non-transitory computer readable storage medium storing instructions, when executed, cause an information processing apparatus to perform:
  displaying as selectable one or more numbers of pages to fit to a single sheet, each of the numbers equal to or greater than a predetermined reference number of pages to fit to a single sheet;
  receiving, as a selected number of pages to fit to a single sheet one of the one or more selectable numbers of pages;
  setting the received number of pages to the selected number of pages to fit to a single sheet; and
  displaying as not-selectable one or more numbers of pages to fit to the single sheet, each of the non-selectable numbers of pages is smaller than the predetermined reference number of pages.

* * * * *